(12) United States Patent
Yokokawa

(10) Patent No.: US 7,184,082 B2
(45) Date of Patent: Feb. 27, 2007

(54) IMAGE DISPLAYING SYSTEM, IMAGE DISPLAYING METHOD, IMAGE PRINTING SYSTEM, AND IMAGE PRINTING METHOD

(75) Inventor: Koh Yokokawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 680 days.

(21) Appl. No.: 10/229,929

(22) Filed: Aug. 27, 2002

(65) Prior Publication Data

US 2003/0063198 A1    Apr. 3, 2003

(30) Foreign Application Priority Data

Aug. 28, 2001 (JP) ............... 2001-258708
Jan. 7, 2002 (JP) ............... 2002-000943

(51) Int. Cl.
*H04N 5/76* (2006.01)
(52) U.S. Cl. ............... 348/231.2; 348/231.5; 348/231.6; 348/333.02; 348/333.05; 348/231.99
(58) Field of Classification Search ............... 348/231.3, 348/231.5, 231.6, 333.02, 333.05, 231.2, 348/231.99; 707/7
See application file for complete search history.

(56) References Cited

U.S. PATENT DOCUMENTS

| | | | | |
|---|---|---|---|---|
| 5,805,215 A | * | 9/1998 | Mizoguchi | 348/231.5 |
| 5,903,309 A | * | 5/1999 | Anderson | 348/333.02 |
| 6,538,698 B1 | * | 3/2003 | Anderson | 348/333.05 |
| 6,577,805 B1 | * | 6/2003 | Hirai | 386/46 |
| 6,590,608 B2 | * | 7/2003 | Matsumoto et al. | 348/231.2 |
| 6,862,038 B1 | * | 3/2005 | Anderson | 348/207.99 |
| 6,928,230 B2 | * | 8/2005 | Squibbs | 386/46 |
| 2003/0198390 A1 | * | 10/2003 | Loui et al. | 382/224 |

FOREIGN PATENT DOCUMENTS

| | | |
|---|---|---|
| JP | 2000025296 A | 1/2000 |
| JP | 2000032370 A | 1/2000 |
| JP | 2001054041 A | 2/2001 |
| JP | 2001229176 A | 8/2001 |

OTHER PUBLICATIONS

Japan Electronic Industry Development Association (JEIDA), "Digital Still Camera Image File Format Standard (Exchangeable image file format for Digital Still Cameras: Exif) Version 2.1", Jun. 12, 1998.*

* cited by examiner

*Primary Examiner*—Vivek Srivastava
*Assistant Examiner*—Chriss S. Yoder
(74) *Attorney, Agent, or Firm*—Straub and Pokotylo; John C. Pokotylo

(57) ABSTRACT

An image displaying system comprises a display unit displaying an image, an extracting unit extracting an image based on a predetermined rule from among images which are recorded on a recording medium, and attached with shooting information and obtained by shooting, and a representative image display unit making the display unit display the image extracted by the extracting unit as a representative image.

1 Claim, 17 Drawing Sheets

TYPE A

|   | SHOOTING DATE | CAMERA POWER SUPPLY ON/OFF DURATION | | | | |
|---|---|---|---|---|---|---|
|   |   | DURATION 1 | DURATION 2 | DURATION 3 | DURATION 4 | DURATION 5 |
| 1 | SEPTEMBER 1 | 1~5 | 6~10 | 11~16 | 17~22 | 23~28 |
| 2 | OCTOBER 5 | 29~35 | | | | |
| 3 | OCTOBER 10 | 36~40 | 41~50 | | | |
| 4 | OCTOBER 20 | 51~60 | | | | |
| 5 | OCTOBER 25 (TODAY) | 61~70 | 71~80 | 81~84 | 85~88 | 89~(95) |

F I G. 3 A

TYPE B

|   | SHOOTING DATE | BELONGING FRAME NUMBERS | CAMERA POWER SUPPLY ON~ |
|---|---|---|---|
| 1 | SEPTEMBER 1 | 1~28 | |
| 2 | OCTOBER 5 | 29~35 | |
| 3 | OCTOBER 10 | 36~50 | |
| 4 | OCTOBER 20 | 51~60 | |
| 5 | OCTOBER 25 (TODAY) | 61~88 | 89~(95) |

F I G. 3 B

CASE OF SINGLE FRAME
DISPLAY AT PRESENT
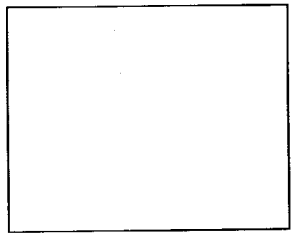
F I G. 4 A
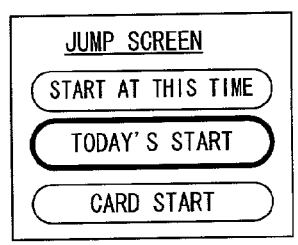
F I G. 4 B
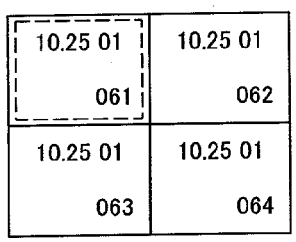
NORMAL INDEX DISPLAY
F I G. 4 E
SWITCHING
BETWEEN
INDEX
DISPLAY AND
SINGLE
FRAME
DISPLAY
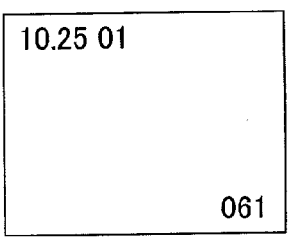
NORMAL SINGLE FRAME
DISPLAY
F I G. 4 C
ONE FLAME
REWIND
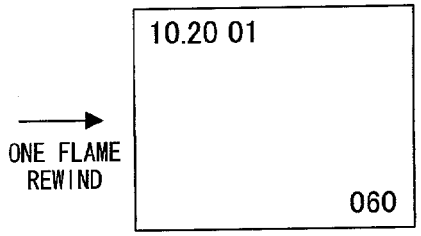
NORMAL SINGLE FRAME DISPLAY
F I G. 4 D CASE OF INDEX DISPLAY AT PRESENT
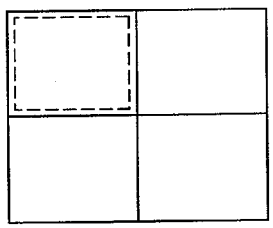
FIG. 5A
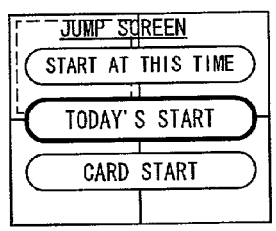
FIG. 5B
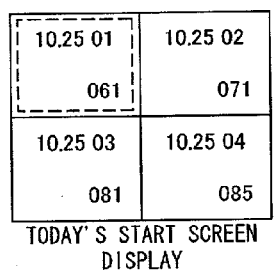
TODAY'S START SCREEN DISPLAY
FIG. 5C
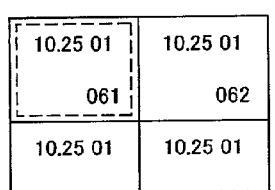
NORMAL INDEX DISPLAY
FIG. 5F
SWITCHING BETWEEN INDEX DISPLAY AND SINGLE FRAME DISPLAY
NORMAL SINGLE FRAME DISPLAY
FIG. 5D
ONE FRAME REWIND
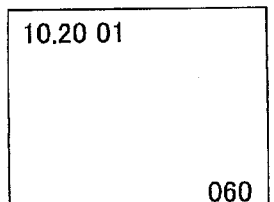
NORMAL SINGLE FRAME DISPLAY
FIG. 5E

| 10.25 05 15:30 089 | 10.25 05 15:31 090 |
|---|---|
| 10.25 05 15:31 091 | 10.25 05 15:31 092 |

"START AT THIS TIME"
(TYPES A AND B)

F I G. 6 A

| 09.01 01 001 | 09.01 01 002 |
|---|---|
| 09.01 01 003 | 09.01 01 004 |

"CARD START"
(TYPES A AND B)

F I G. 6 B

| 09.01 01 001 | 10.05 01 029 |
|---|---|
| 10.10 01 036 | 10.20 01 051 |

FIRST PAGE

| 10.25 01 061 | |
|---|---|
| | |

SECOND PAGE

"CARD START"
(TYPES A AND B )

F I G. 6 C

| CAMERA POWER SUPPLY ON/OFF DURATION | SHOOTING CONDITION | | | | | |
|---|---|---|---|---|---|---|
| | CONDITION 1 | CONDITION 2 | CONDITION 3 | CONDITION 4 | CONDITION 5 | CONDITION 6 |
| DURATION 1 | 1~13 | 14~30 | 31~45 | | | |
| DURATION 2 | | | | 46~60 | 61~70 | |
| DURATION 3 | | | | | 71~80 | 81~(90) |

FIG. 7A

| SHOOTING CONDITION | BELONGING FRAME NUMBERS |
|---|---|
| CONDITION 1 | 1~13 |
| CONDITION 2 | 14~30 |
| CONDITION 3 | 31~45 |
| CONDITION 4 | 46~60 |
| CONDITION 5 | 61~80 |
| CONDITION 6 | 81~(90) |

FIG. 7B

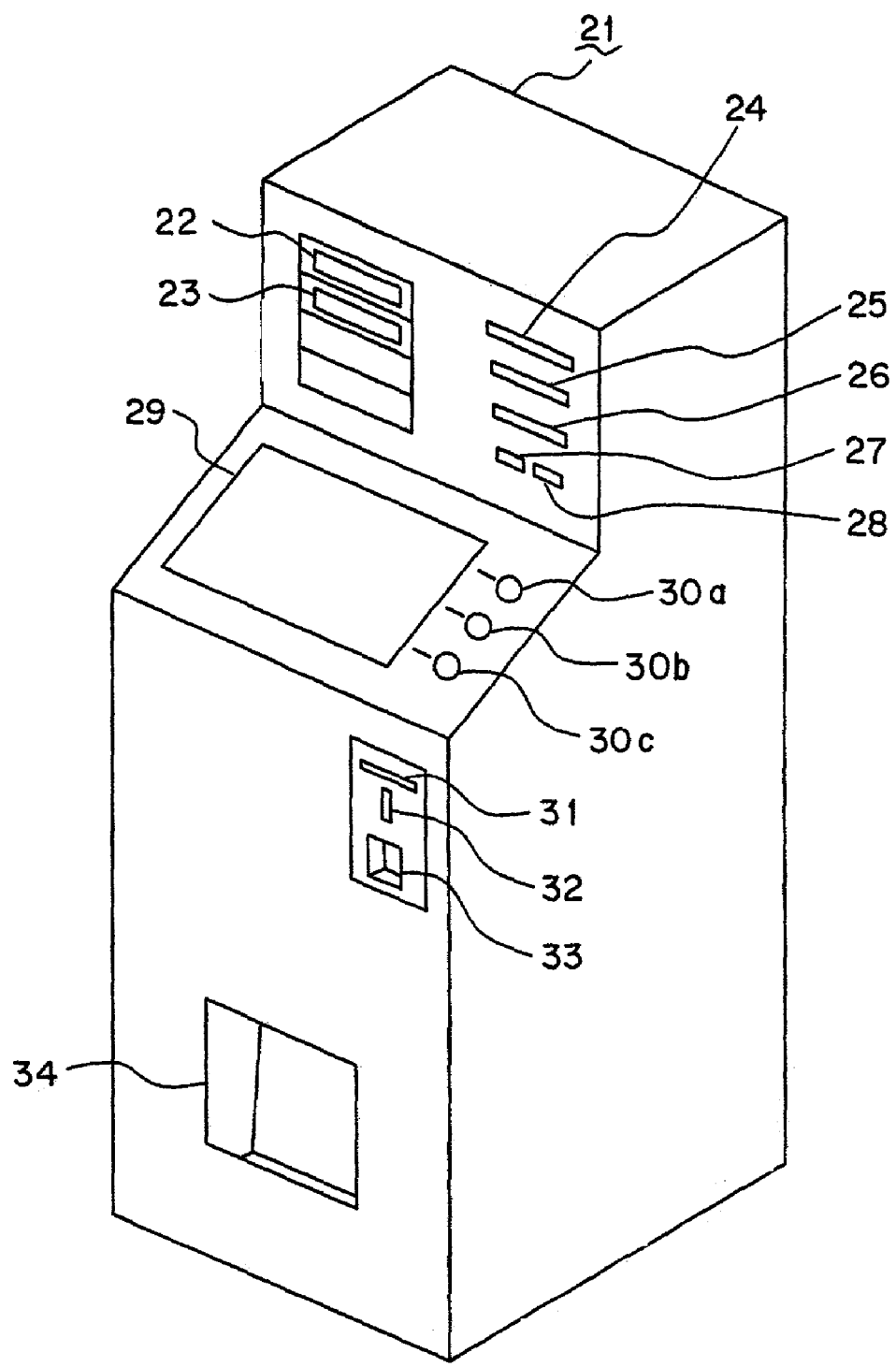
F I G. 8

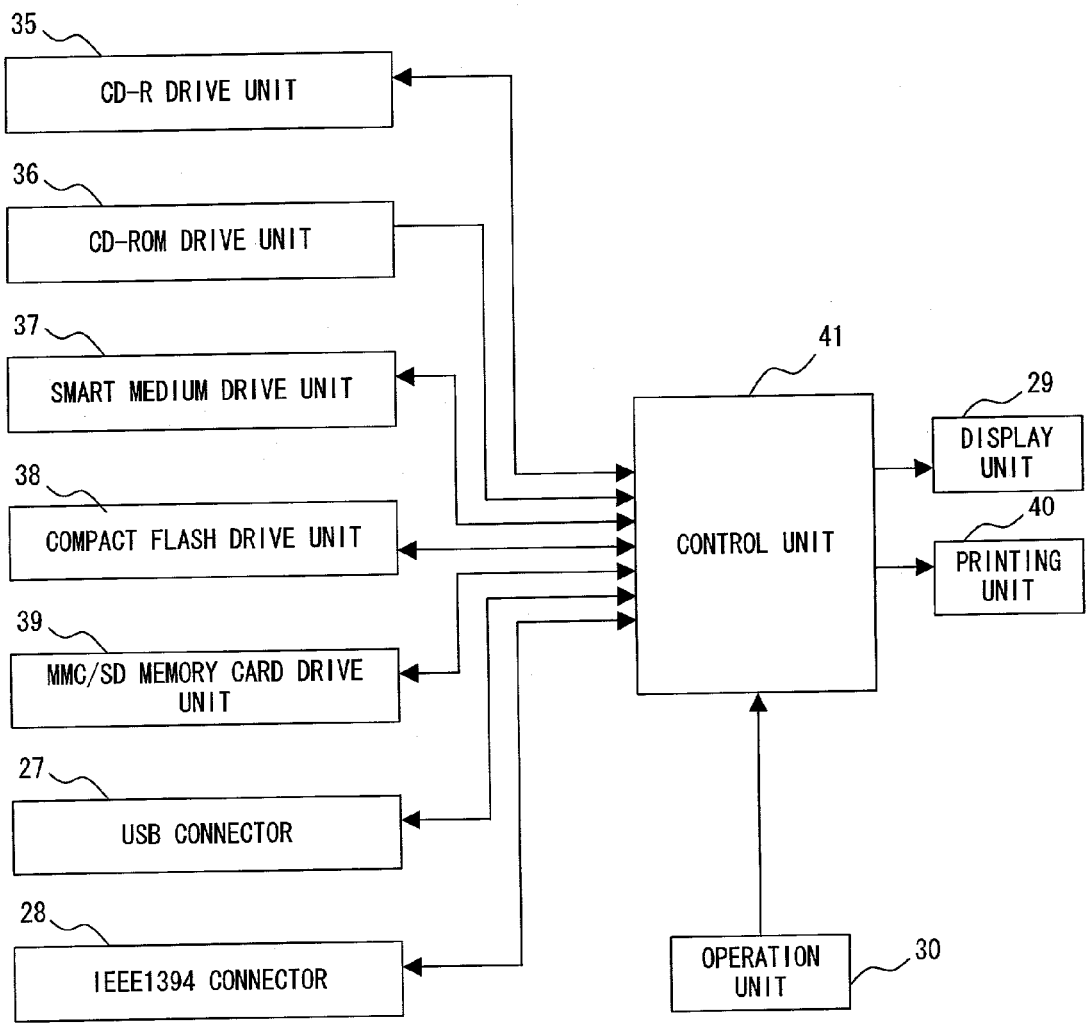
F I G. 9

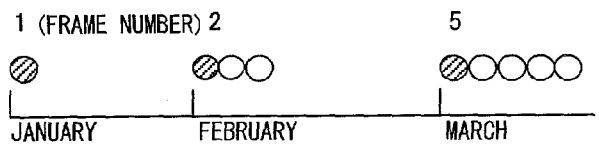
F I G. 1 1 A
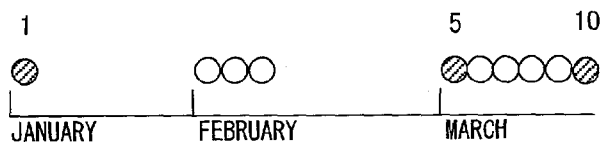
F I G. 1 1 B
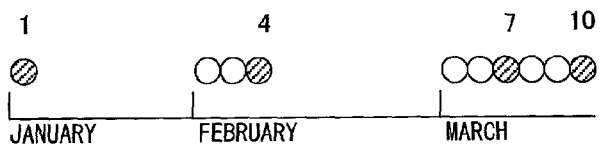
F I G. 1 1 C
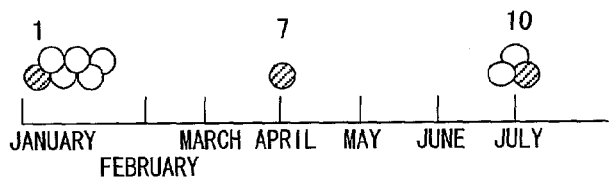
F I G. 1 1 D
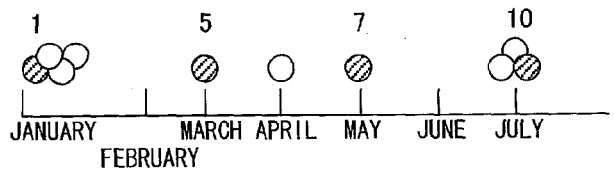
F I G. 1 1 E
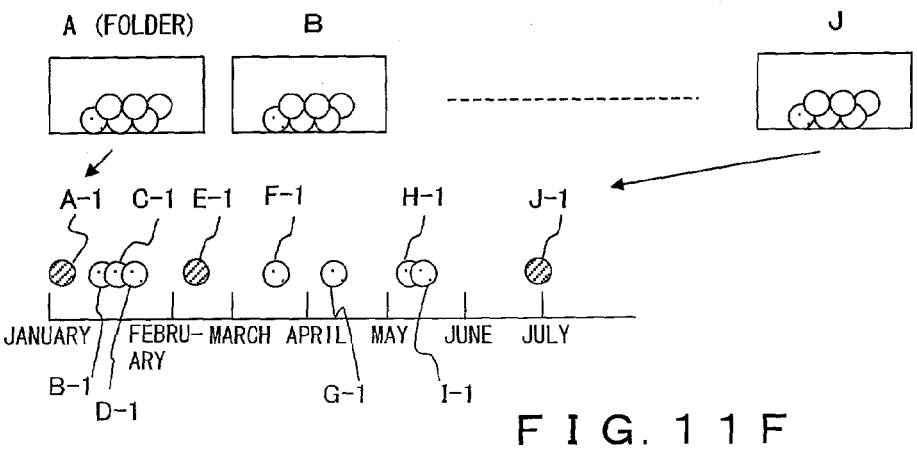
F I G. 1 1 F

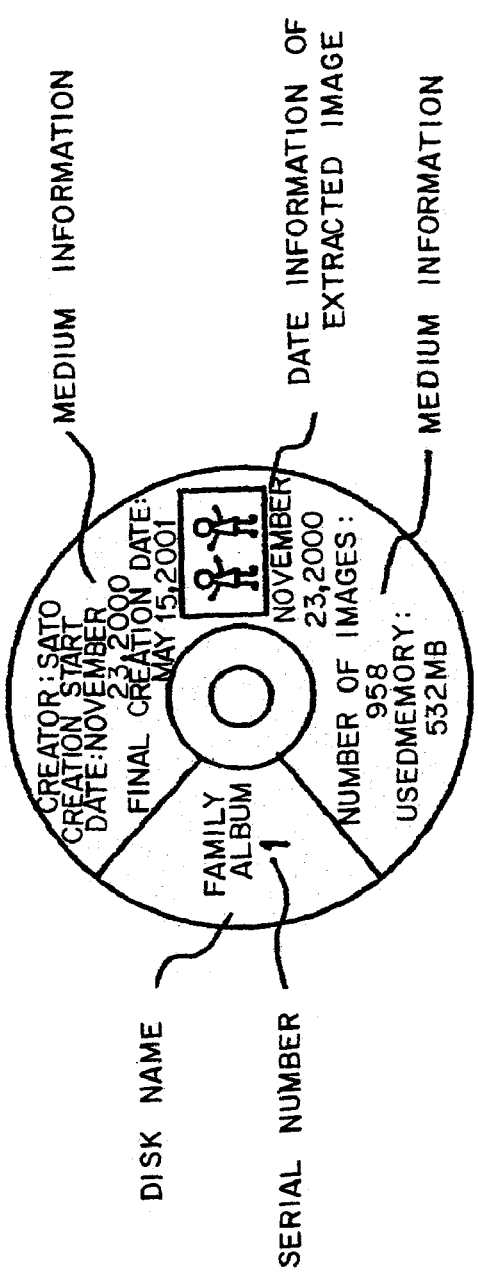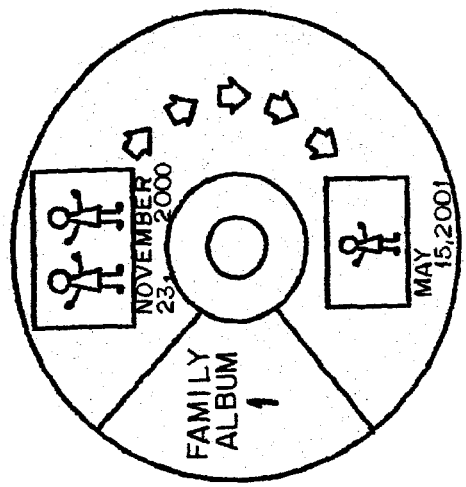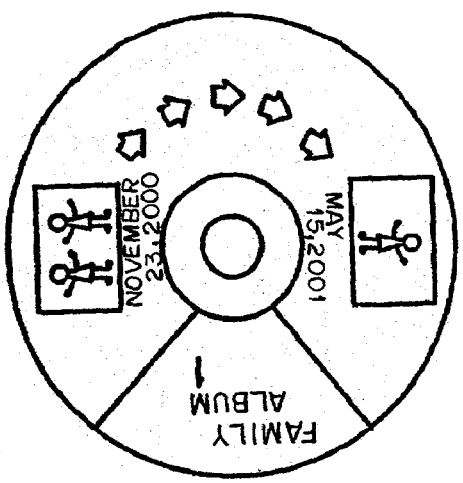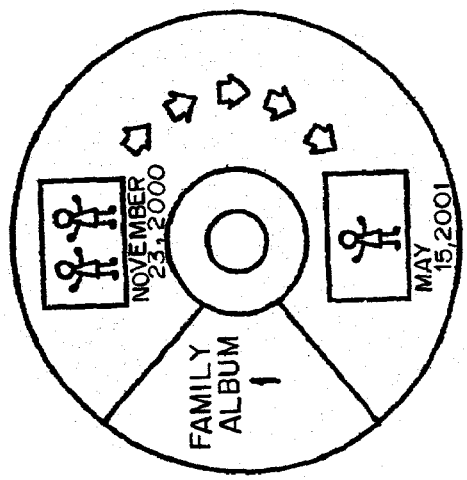

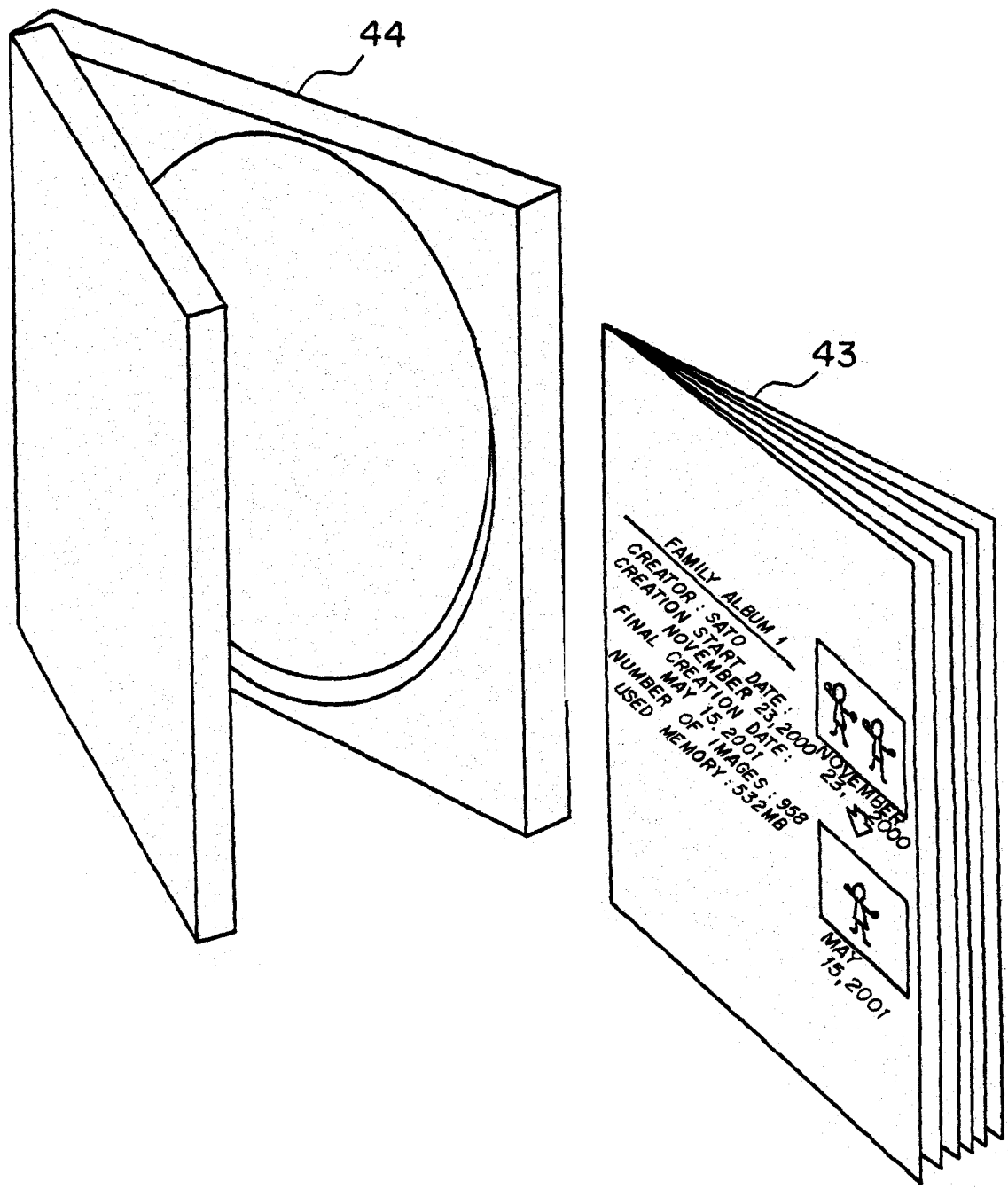
F I G. 16

IMAGE DISPLAYING SYSTEM, IMAGE DISPLAYING METHOD, IMAGE PRINTING SYSTEM, AND IMAGE PRINTING METHOD

BACKGROUND OF THE INVENTION

1. Field of the Invention

The present invention relates to a technique extracting a particular image from among a plurality of images.

2. Description of the Related Art

With the popularization of digital appliances such as a digital camera, etc, data that represents an image has been frequently handled in recent years. Accompanying this phenomenon, the capacity of a small-sized recording medium such as a smart medium, a compact flash, etc., which are loaded into a digital camera, etc. has been increased to enable more images to be recorded. Furthermore, large-capacity recording media such as a CD-RW (CD-ReWritable), a DVD-RAM (Digital Versatile Disk-RAM), etc. have been frequently used as recording media for storing images. As a result, many images can be recorded on one recording medium, whereby it becomes easier to manage a recording medium than ever before.

However, since many images are recorded on a recording medium, it becomes difficult to extract a particular target image from among the images in a short time.

By way of example, for a digital camera, a user sometimes displays his or her desired image on an LCD (Liquid Crystal Display) of the back of the main body of the camera from among images which are shot and recorded on a loaded recording medium so as to confirm the shot image. In this case, the image is displayed on the LCD in a single frame format or an index format depending on a way of using a display format by the user. An image display in the single frame format (hereinafter referred to simply as a single frame display) is a display format in which only one image is displayed on an LCD. In the meantime, an image display in the index format (hereinafter referred to simply as an index display) is a display format in which a plurality of images such as 2×2, 3×3, 4×4, etc. are simultaneously displayed on an LCD.

In the index display, frame advance is made for each index image composed of a plurality of images. Therefore, this is a display format more suitable for searching for a desired image than the single frame display in which frame advance is made for each image.

However, unlike the single frame display, image processes for creating an index image, such as a resize process for simultaneously displaying a plurality of images, and the like are performed in the index display. Therefore, if frame advance (index image advance) is made by many times in the index display, the image processes for creating an index image are performed by many times. As a result, it takes a lot of time to search for a desired image, leading to a difficulty in searching for the desired image in a short time.

Additionally, the single frame display is sometimes configured to enable a uniform frame advance made every plural images (by way of example, frame advance made every 10 frames). However, if a desired image is searched in such a single frame display, the image can possibly be skipped. It is difficult to search for the desired image in a short time also in this case.

Furthermore, as another method selecting a particular target image from among a plurality of images, for example, Japanese Patent Publication No. 2001-229176 proposes an image displaying apparatus that displays a search screen for narrowing down the number of images if the number of images to be displayed becomes equal to or larger than a predetermined number, displays a listing after the images to be displayed are narrowed down by specifying a shooting date and time, etc. on the search screen, and makes a user select a desired image from the displayed listing. With this proposal, however, a sufficient number of images cannot be listed and displayed if a display unit is small. Therefore, it cannot be said that this technique is an effective proposal for a configuration where a small display unit such as an LCD, etc. is comprised on the back of a digital camera, etc.

Furthermore, by way of example, Japanese Patent Publication No. 2001-54041 proposes a digital camera that automatically creates a new folder whose creation date is a shooting date and stores a shot image in the folder, if the shooting date is different from the creation date of a folder created on a recoding medium, or stores a shot image within a folder if a shooting date matches the creation date of the folder created on a recording medium, so as to ease a search at the time of replay. However, also with this proposal, it is difficult to search for a desired target image in a short time if the number of images recorded to a folder becomes large.

In the meantime, a large-capacity recording medium such as a CD-RW, etc. is generally managed by affixing a label on which contents of a recorded image, for example, contents of an event (such as an occasion, a trip, an athletic meeting, etc.) to be shot, an image file name, etc. are written to the recording medium. However, if the number of images becomes large, contents of a recorded image cannot be definitely determined in some cases only by confirming items written to a label.

Accordingly, for example, Japanese Patent Publication No. 2000-25296 proposes an image replaying apparatus that decides a print size of recording paper (label) according to a loaded recording medium, and prints a predetermined image selected by a user on the recording paper according to the print size. With this proposal, a user can determine the contents of a recorded image by confirming the image printed on recording paper affixed to a recording medium. However, the user must select an image to be printed on the recording paper, namely, an image whose recording contents can be determined later from among images that are displayed in the index display on a monitor unit, and recorded on the recording medium. Therefore, if the number of recorded images is enormous, it is difficult to select a target image in a short time.

SUMMARY OF THE INVENTION

The present invention was developed to overcome the above described problems, and aims at allowing a particular target image to be easily extracted from among a plurality of images in a short time.

An image displaying system according to a first preferred embodiment of the present invention is configured to comprise: a display unit displaying an image; an extracting unit extracting an image based on a predetermined rule from among images, which are recorded on a recording medium, and attached with shooting information and obtained by shooting; and a representative image display unit making the display unit display the image extracted by the extracting unit as a representative image.

With this configuration, the image extracted based on the predetermined rule from among the images recorded on the recording medium is displayed on the display unit. The shooting information attached to the image is, for example, information about a date and time when the image is obtained by shooting, a shooting condition under which the image is obtained by shooting, and the like.

An image printing system according to a second preferred embodiment of the present invention is configured to comprise: a selecting unit selecting a particular image based on a predetermined condition from among a plurality of images which are recorded on a recording medium and attached with image management information; a reading unit reading the particular image selected by the selecting unit from the recording medium; and a printing unit printing the particular image read by the reading unit on a print target.

With this configuration, an image selected based on a predetermined condition is read from a plurality of images recorded on a recording medium, and printed on a print target. Image management information attached to an image is, for example, information about a date and time when the image is obtained by shooting, and the like.

BRIEF DESCRIPTION OF THE DRAWINGS

FIG. 3A shows the relationship between the shooting dates, camera power supply ON/OFF durations, and frame numbers of images that are shot by an electronic camera of a type A and recorded on a memory card;

FIG. 3B shows the relationship between the shooting dates and frame numbers of images that are shot by an electronic camera of a type B and recorded on a memory card;

FIG. 4A exemplifies an LCD display when the start image display process is performed;

FIG. 4B exemplifies an LCD display when the start image display process is performed;

FIG. 4C exemplifies an LCD display when the start image display process is performed;

FIG. 4D exemplifies an LCD display when the start image display process is performed;

FIG. 4E exemplifies an LCD display when the start image display process is performed;

FIG. 5A exemplifies an LCD display when the start image display process is performed;

FIG. 5B exemplifies an LCD display when the start image display process is performed;

FIG. 5C exemplifies an LCD display when the start image display process is performed;

FIG. 5D exemplifies an LCD display when the start image display process is performed;

FIG. 5E exemplifies an LCD display when the start image display process is performed;

FIG. 5F exemplifies an LCD display when the start image display process is performed;

FIG. 6A exemplifies an LCD display when the start image display process is performed;

FIG. 6B exemplifies an LCD display when the start image display process is performed;

FIG. 6C exemplifies an LCD display when the start image display process is performed;

FIG. 7A shows the relationship between camera power supply ON/OFF durations, shooting conditions, and frame number of images that are shot and recorded by the electronic camera of the type A;

FIG. 7B shows the relationship between the shooting conditions and frame numbers of images that are shot and recorded by the electronic camera of the type B;

FIG. 8 is a perspective external view of the image printing system according to a second preferred embodiment;

FIG. 9 is a block diagram showing the principal configuration of the image printing system;

FIG. 11A explains a condition 1 for selecting a particular image;

FIG. 11B explains a condition 2 for selecting a particular image;

FIG. 11C explains a condition 3 for selecting a particular image;

FIG. 11D explains a condition 4 for selecting a particular image;

FIG. 11E explains a condition 5 for selecting a particular image;

FIG. 11F explains a condition 6 for selecting a particular image;

FIG. 14A shows a printing example of a label for a circular recording medium, or on the circular recording medium;

FIG. 14B shows a printing example of a label for a circular recording medium, or on the circular recording medium;

FIG. 14C shows a printing example of a label for a circular recording medium, or on the circular recording medium;

FIG. 14D shows a printing example of a label for a circular recording medium, or on the circular recording medium;

FIG. 16 shows a printing example of an index sheet.

DESCRIPTION OF THE PREFERRED EMBODIMENTS

Hereinafter, preferred embodiments according to the present invention are explained with reference to the drawings.

Firstly, a first preferred embodiment according to the present invention is explained.

Figure 1:
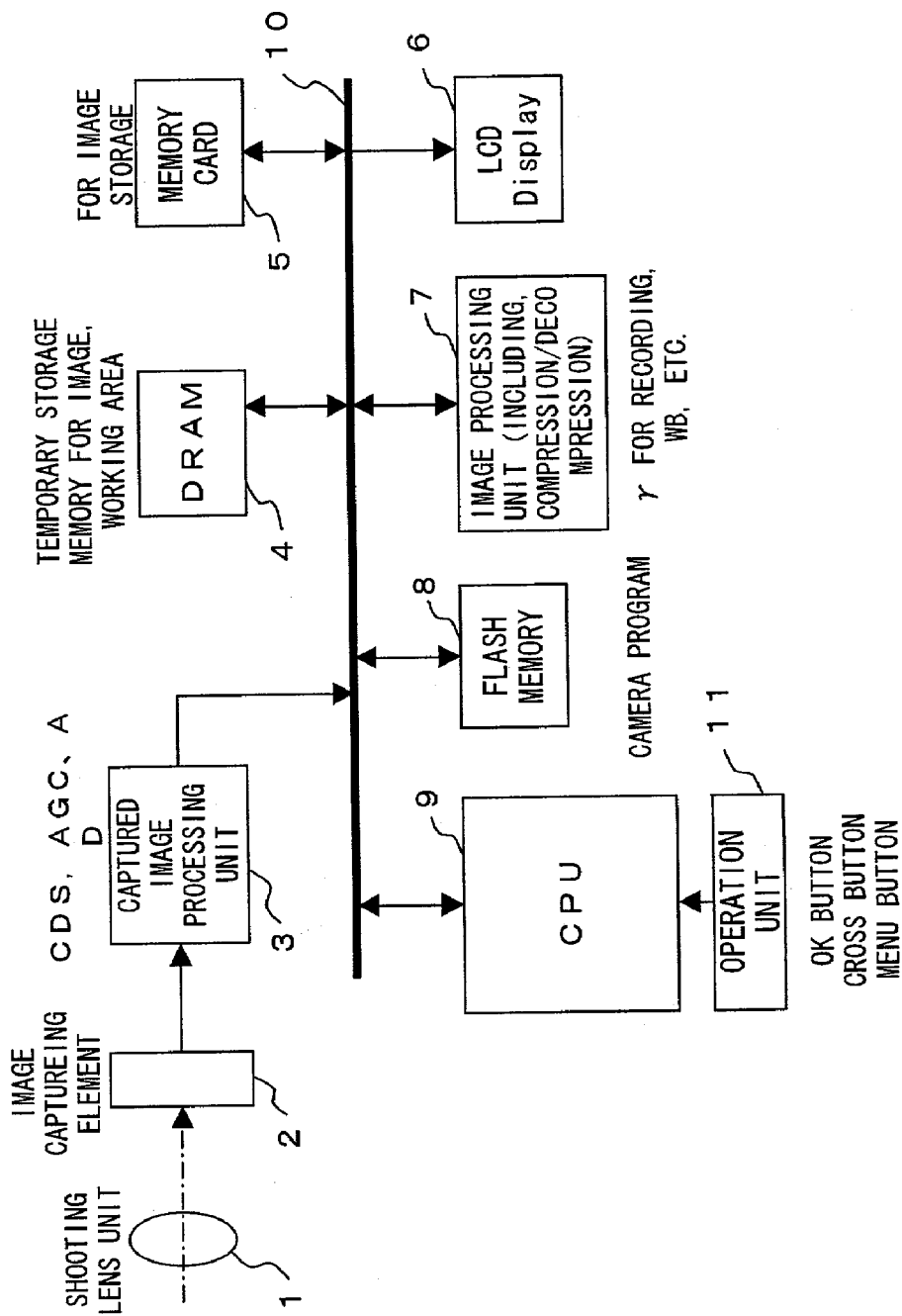
FIG. 1 exemplifies the configuration of an electronic camera comprising an image displaying system according to a first preferred embodiment of the present invention.

FIG. 1 exemplifies the configuration of an electronic camera comprising an image displaying system according to the first preferred embodiment of the present invention.

In this figure, a shooting lens unit 1 is configured by comprising a focus lens, etc., and forms an image of a subject on an image capturing element 2.

The image capturing element 2 is, for example, a CCD (Charge Coupled Device). The image capturing element 2 opto-electrically converts the image of the subject formed on the image capturing element 2 with an operation of the shooting lens unit 1, and outputs an electric signal which represents the image.

A captured image processing unit 3 is configured by comprising a CDS (Correlated Double Sampling) which reduces a noise component, an AGC (Automatic Gain Control) which stabilizes a signal level, an A/D which converts an analog electric signal into a digital electric signal, and the like. The captured image processing unit 3 reduces the noise component of the analog electric signal output from the image capturing element 2, converts the analog electric signal into a digital electric signal after stabilizing the level of the signal, and outputs the signal.

All of the captured image processing unit 3, a DRAM 4, a memory card 5, an LCD display 6, an image processing unit 7, a flash memory 8, and a CPU 9 are connected to a bus 10, and can exchange data one another.

The DRAM (Dynamic Random Access Memory) 4 is a memory used as a temporary storage of image data (digital electric signal) output from the captured image processing unit 3, image data being processed in each type of an image process performed by the image processing unit 7, and the like, or used as a working area for performing a control process by the CPU 9.

The memory card 5 is a recording medium that is loadable/unloadable to/from the electronic camera. The memory card 5 records and stores image data that represents an image shot by the electronic camera, and the like. This memory card is connected to the bus 10 via a card I/F, although this is not shown in FIG. 1.

The LCD display (hereinafter referred to simply as an LCD) 6 is a display unit that displays an image (shot image) represented by image data, respective types of menus, etc. For example, one image in the single frame display, or an index image composed of a plurality of small images (small shot images) in the index display, or the like are displayed. The LCD 6 is connected to the bus 10 via an LCD driver, although this is not shown.

The image processing unit 7 performs respective types of processes such as correction processes, for example, a γ correction, a white balance (WB) correction, etc., which are performed when image data is recorded, image data compression/decompression processes using a JPEG (Joint Photographic Experts Group) method, etc. for recording/replaying image data, enlargement/reduction processes (resize processes) for increasing/decreasing the number of pixels which configure an image, and the like.

The flash memory 8 is a nonvolatile memory that can be electrically rewritten. In the flash memory 8, a camera program, etc. executed by the CPU 9 are prestored.

The CPU 9 is a central processing unit, and controls the whole of the electronic camera by executing the camera program prestored in the flash memory 8.

An operation unit 11 is respective types of buttons, switches, etc. for accepting each type of an instruction from a user and for notifying the CPU 9 that the instruction is accepted. For example, a menu button for instructing the LCD 6 to display a start image display menu, a cross button for instructing a predetermined rule within a displayed menu, a predetermined image within an index image, or the like, an OK button for instructing the confirmation of an instructed predetermined rule, predetermined image, etc., a power supply button for instructing the camera power supply ON/OFF, and the like.

Next, the start image display process performed at the time of the replay mode is explained as an example of the control process performed by the CPU 9 of the electronic camera having the above described configuration. The CPU 9 reads and executes the camera program stored in the flash memory 8, so that this process is performed.

Figures 2A, 2B:
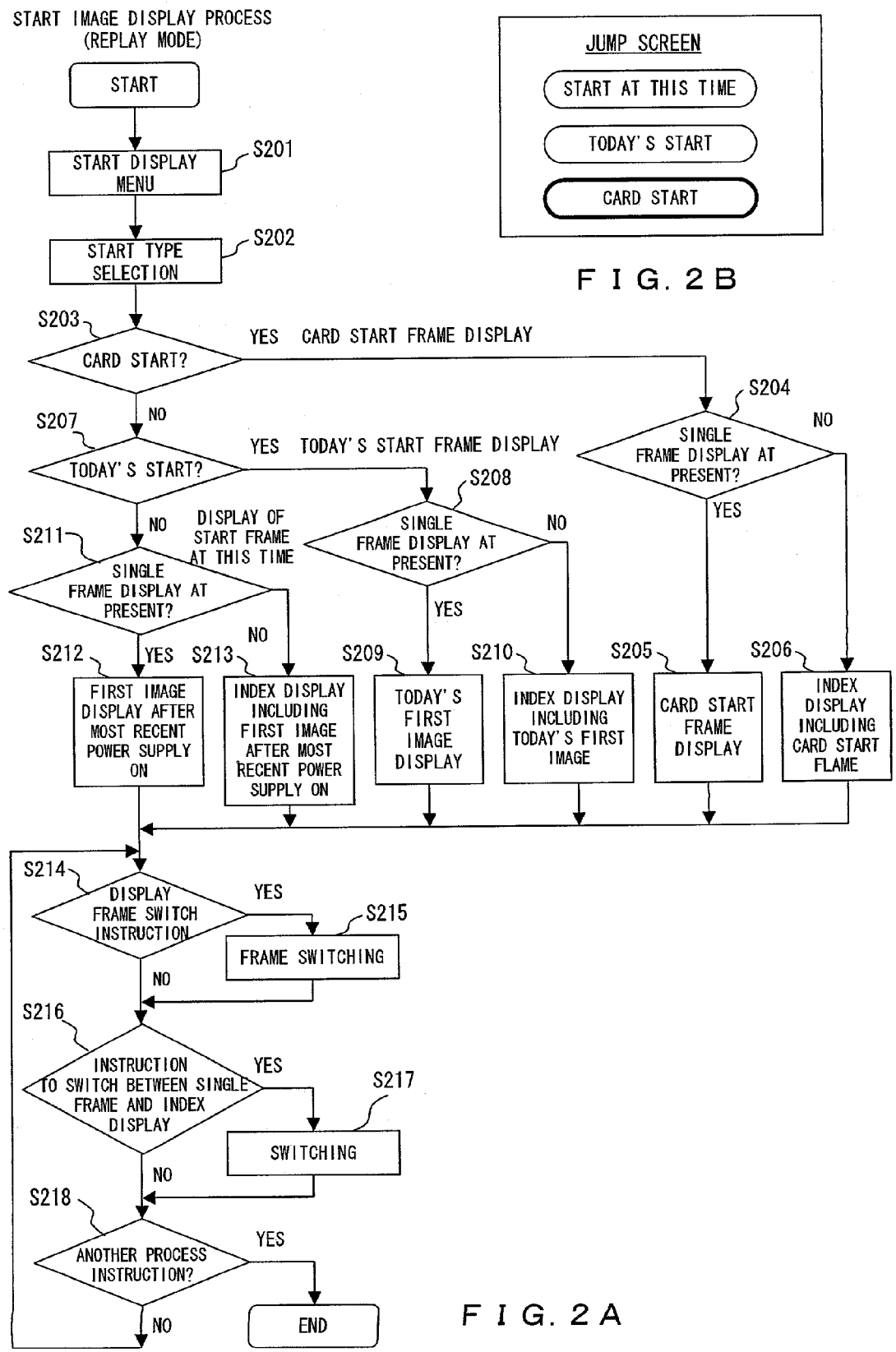
FIG. 2A is a flowchart showing the contents of a start image display process performed at the time of a replay mode.
FIG. 2B exemplifies a display made on an LCD during the process shown in FIG. 2A.

FIG. 2A is a flowchart showing the contents of the start image display process performed at the time of the replay mode, whereas FIG. 2B exemplifies a display made on the LDC 6 during this process.

In FIG. 2A, firstly in S201, a user presses a menu button, so that the start image display menu is displayed on the LCD 6. At this time, rules for an image display, which can be instructed/confirmed by the user, are displayed in the start image display menu. The rules for an image display are rules by which a user extracts a representative image that is suitable for easily searching the memory card 5 for a desired image in a short time. When a predetermined rule is instructed from the start image display menu, an image whose shooting date and time is the oldest among images which are extracted based on the instructed rule is displayed on the LCD 6.

FIG. 2B shows one example of the start image display menu (jump screen) displayed on the LCD 6. In this figure, the rule indicated by a thick line represents a currently instructed rule. Here, "card start" is instructed by default. As shown in FIG. 2B, "start at this time", "today's start", and "card start" are displayed as rules for an image display in this preferred embodiment. "start at this time" is a rule for extracting an image from the memory card 5 on the condition that the image is shot at the time of the most recent camera power supply ON or later. Accordingly, this is a rule suitable in the case where an image desired by a user is an image that is shot at the time of the most recent camera power supply ON or later. Additionally, "today's start" is a rule for extracting an image from the memory card 5 on the condition that the image is an image shot today, namely, an image that is shot on a day when "today's start" is instructed/confirmed by a user as a rule for an image display. Accordingly, this is a rule suitable in the case where an image desired by a user is an image shot today. Furthermore, "card start" is a rule for extracting an image whose shooting date and time is the oldest from among the images recorded on the memory card 5. Accordingly, this is a rule suitable in the case where an image desired by a user is the image whose shooting date and time among the images recorded on the memory card is the oldest.

Turning back to FIG. 2A. In S202, a predetermined rule is instructed/confirmed (selected) from the start image display menu. A rule is instructed by user operating the cross button, and confirmed by pressing the OK button. Namely, a predetermined rule is instructed by operating the cross button, and the instructed rule is confirmed by pressing the OK button.

In S203, it is determined whether or not the rule instructed/confirmed in the preceding step is "card start". If the result of this determination is "Yes", the process proceeds to S204. If the result of the determination is "No", the process proceeds to S207.

In S204, it is determined whether or not the currently instructed display format is a single frame display. If the result of the determination is "YES", the process proceeds to S205. If the result of the determination is "No", the process proceeds to S206. This display format instruction is made by user issuing an instruction to switch between the single frame display and the index display via the operation unit 11. If the instruction is not issued, the single frame display is instructed by default.

In S205, an image whose shooting date and time is the oldest is read from among the images recorded on the memory card 5, and the read start image is displayed on the LCD 6 in the single frame display. Then, the process proceeds to S214.

In S206, the image whose shooting date and time is the oldest is recognized as the start image from among the images recorded on the memory card 5, and a plurality of images including that start image are read and displayed in the index display on the LCD 6. The process then proceeds to S214.

In S207, it is determined whether or not the rule instructed/confirmed in S202 is "today's start". If the result of the determination is "Yes", the process proceeds to S208. If the result of the determination is "No", the process proceeds to S211.

In S208, it is determined whether or not the currently instructed display format is the single frame display. If the result of the determination is "Yes", the process proceeds to S209. If the result of the determination is "No", the process proceeds to S210. This display format instruction is as explained in the above described S204.

In S209, an image that is shot today among the images recorded on the memory card 5, namely, the image whose shooting time is the oldest is read as the start image from among images that are shot on the date when "today's start" is instructed/confirmed as a rule. The read start image is then displayed on the LCD 6 in the single frame display, and the process proceeds to S214.

In S210, an image that is shot today among the images recorded on the memory card 5, namely, the image whose shooting time is the oldest among the images that are shot on a day when "today's start" is instructed/confirmed as a rule is recognized as a start image. A plurality of images including the start image are then read and displayed on the LCD 6 in the index display. Then, the process proceeds to S214.

In S211, it is determined whether or not the currently instructed display format is the single frame display. If the result of the determination is "Yes", the process proceeds to S212. If the result of the determination is "No", the process proceeds to S213. This display format instruction is as explained in the above described S204.

In S212, an image, whose shooting date and time is the oldest among images that are shot at the time of the most recent camera power supply ON or later among the images recorded on the memory card 5, is read as a start image, and the read start image is displayed on the LCD 6 in the single frame display. The process then proceeds to S214. Therefore if shooting is not made at the time of the most recent camera power supply ON or later in S212, no images are displayed.

In S213, an image, whose shooting date and time is the oldest among the images that are shot at the time of the most recent camera power supply ON or later among the images recorded on the memory card 5, is recognized as a start image, and a plurality of images including the start time are read and displayed on the lCD 6 in the index display. The process then proceeds to S214. Also in this step, if shooting is not made at the time of the most recent camera power supply ON or later, no images are displayed.

In S214, it is determined whether or not the cross button is pressed, and an instruction to advance an image displayed on the LCD 6 (an instruction to switch a displayed frame) is issued. If the result of the determination is "YES", the process proceeds to S215. If the result of the determination is "NO", the process proceeds to S216.

In S215, the image displayed on the LCD 6 is advanced (frame switching is made) with a press of the cross button in the preceding step. For example, in the single frame display, images are advanced frame by frame. In the index display, images are advanced page (single index image) by page.

In S216, it is determined whether or not the instruction to switch between the single frame display and the index display is issued via the operation unit 11. If the result of the determination is "YES", the process proceeds to S217. If the result of the determination is "NO", the process proceeds to S218.

In S217, the display format is switched according to the instruction issued in the preceding step.

In S218, it is determined whether or not an instruction to perform another process is issued via the operation unit 11. If the result of the determination is "YES", this flow is terminated. If the result of the determination is "NO", the process returns to S214, and the above described processes are performed repeatedly.

The processes up to this point are the start image display process performed in the replay mode. The CPU 9 performs this process, so that an image based on a rule instructed by a user is displayed on the LCD 6. As a result, a representative image, which is convenient to a user to search for a desired image can be displayed, and the user can easily display the desired image on the LCD 6 based on the representative image in a short time.

Examples of images that are displayed on the LCD 6 with such a start image display process are explained next.

Here, in the electronic camera shown in FIG. 1, display examples of the electronic camera of the type A that comprises a function for attaching a shooting history, which indicates during which camera power supply ON duration (duration from ON to OFF of the camera power supply) an image is shot on the shooting date of the image, to the shot image, and for recording the image with the history attached on a recording medium (memory card 5, etc.), and a function for extracting (reading) the corresponding image from the recording medium based on the shooting history, for example, an image shot during a camera power supply ON of a predetermined ordinal number, and the electronic camera of the type B that does not comprise such functions are described.

The above described information about the shooting history is attached to a shot image, and recorded on a recording medium, for example, based on the Exif (Exchangeable Image File Format) standard, which is an image file format standard for a digital still camera, or the like. Also other information such as a shooting date and time, shooting condition (shutter speed, exposure, etc.), and the like are attached to the shot image and recorded based on the Exif standard, etc. The information about the shooting history, and the information about a shooting date and time, a shooting condition, etc. are one example of shooting information attached to an image.

First of all, images that are shot by the electronic camera of the type A or B and recorded on a memory card 5 are explained prior to an explanation of the examples of images displayed on the LCD 6.

FIG. 3A shows the relationship between shooting dates, camera power supply ON/OFF durations, and frame number of images that are shot by the electronic camera of the type A and recorded on a memory card 5_1. FIG. 3B shows the relationship between shooting dates and frame numbers of images that are shot by the electronic camera of the type B and recorded on a memory card 5_2. In this example, the frame numbers and the shooting dates and times of the images recorded on the memory card 5_1 and those of the images recorded on the memory card 5_2 are assumed to be identical for convenience of explanation. Additionally, in this example, the frame numbers are given in order of older shooting dates.

In FIG. 3A, "shooting date" indicates a date on which an image is shot by the electronic camera of the type A, and recorded on the memory card 5_1. The camera power supply ON/OFF durations represented as "duration 1", "duration 2", "duration 3", "duration 4", and "duration 5" indicate during which camera power supply ON duration (duration from ON to OFF of the camera power supply) the image is shot on the shooting date of the shot image. For example, images shot during the second camera power supply ON duration on October 10 are images from frame numbers 41 to 50. Additionally, a frame number 95 enclosed by parentheses indicates the frame number of the image whose shooting date and time is the newest, and also indicates the state where the electronic camera of the type A is currently shooting, namely, the ON state of the camera power supply. Furthermore, "today" indicates the current date.

In FIG. 3B, "shooting date" indicates a date on which an image is shot by the electronic camera of the type B and recorded on the memory card 5_2. "belonging frame numbers" indicate the frame numbers of images shot on a same shooting date. For example, frame numbers belonging to September 1 are frame numbers 1 to 28. Namely, the images shot on September 1 are images from the frame number 1 to the frame number 28. Additionally, "camera power supply ON~" indicates the frame numbers of images shot from the ON of the camera power supply till the current time point while the camera power supply is ON. In the example shown in FIG. 3B, frame numbers 89 to 95 correspond to the shot images. A frame number enclosed by parentheses and "today" are as explained in FIG. 3A.

The function for extracting images, which are shot from the ON of the camera power supply till the current time point while the camera power supply is currently ON, like the images in the above described "camera power supply ON~" by distinguishing from other images is already comprised by a conventional electronic camera. Both of the electronic cameras of the types A and B comprise this function.

Next, display examples of the LCD 6 when the above described start image display process shown in FIG. 2 is performed by the electronic camera of the type A, into which the memory card 5_1 recording the images shown in FIG. 3A is loaded, are explained.

FIGS. 4A to 4E show display examples of the LCD 6 when the start image display process is performed in the case where the single frame display is instructed first.

FIG. 4A shows a display example of the LCD 6 before a menu button is pressed. In this figure, contents of an image are omitted. For instance, the most recently shot image of the frame number 95 is displayed.

FIG. 4B shows a display example of the LCD 6 when a user presses a menu button to display the start image display menu (jump screen). As shown in this figure, the start image display menu is displayed on the LCD 6 by being superimposed on the image. Namely, the rules for an image display that can be instructed/confirmed by the user, such as "start at this time", "today's start", and "card start" are superimposed on the image and displayed. In FIG. 4B, "today's start" enclosed by a thick line indicates a rule currently instructed.

FIG. 4C shows a display example when "today's start" is instructed/confirmed from the start image display menu shown in FIG. 4B. As shown in this figure, an image of a frame number 61, whose shooting time (shooting date and time) is the oldest among the images shot on today (October 25 in-this example), is displayed on the LCD 6. Upper left numerals shown in FIG. 4C indicate a shooting date (10.25 in this case: October 25), and camera power supply ON/OFF duration (01 in this case: duration 1) (The same is applied to FIGS. 4D, 4E, 5C to 5F, and 6A to 6C). Namely, the image shown in FIG. 4C indicates an image that is shot during the first camera power supply ON duration on October 25. Lower left numerals (061 in this case) in FIG. 4C indicate a frame number (the same is applied to FIGS. 4D, 4E, 5C to 5F, and 6A to 6C). Namely, the image shown in FIG. 4C indicates the image of the frame number 61.

FIG. 4D shows a display example when a user presses a cross key on the display screen shown in FIG. 4C, so that frame advance (one frame rewind in this case) is made. As shown in this figure, an image of a frame number 60 is displayed.

FIG. 4E shows a display example when a user issues an instruction to switch a display format on the display screen shown in FIG. 4C. As shown in FIG. 4E, switching is made from the single frame display to the index display of 2×2. In this example, the image displayed in the single frame display is displayed as an upper left image of the index image, and images of frame numbers succeeding the frame number of the upper left image are sequentially displayed as the other images. A dotted line shown in FIG. 4E indicates a cursor (pointer, etc.) used when an image is instructed, and movable with a cross button (the same is applied to FIGS. 5A to 5C, 5F, and 6A to 6C). Switching can be also made from the index display shown in FIG. 4E to the single frame display shown in FIG. 4C. In this case, however, the image on which the above described cursor is positioned is displayed in the single frame display.

As described above, "today's start" is instructed/confirmed in the single frame display, whereby the image whose shooting time is the oldest among images shot on today is displayed on the LCD 6. Accordingly, a user instructs/confirms this rule, for example, when an image desired to be displayed is an image that is firstly shot on today, or an image that is shot close to the shooting date and time of the image, whereby the user can easily search for the desired image in a short time.

FIGS. 5A to 5F show display examples of the LCD 6 when the start image display process is performed in the case where the index display is instructed first.

FIG. 5A shows a display example of the LCD 6 before a menu button is pressed. In this figure, contents of an image are omitted. For example, the most recently shot 4 images from a frame number 92 to a frame number 95 are displayed as an index image of 2×2.

FIG. 5B shows a display example of the LCD 6 when a user presses a menu button to display the start image display menu (jump screen). As shown in this figure, the start image display menu is displayed on the LCD 6 by being superimposed on the index image. Namely, the rules for an image display, which can be instructed/confirmed by a user, such as "start at this time", "today's start", and "card start" are superimposed on the index image and displayed. "today's start" enclosed by a thick line in FIG. 5B indicates a rule currently instructed.

FIG. 5C shows a display example when "today's start" is instructed/confirmed from the start image display menu shown in FIG. 5B. As shown in this figure, the index image composed of 2×2 images including the frame number 61, whose shooting time (shooting date and time) is the oldest among the images that are shot today (October 25 in this example), namely, the images that are shot on the date when the user instructs/confirms "today's start" as a rule is displayed on the LCD 6. In this example, the image of the frame number 61 is displayed as an upper left image of the index image. The other images are images shot today, whose shooting times are the oldest in respective camera power supply ON/OFF durations, are sequentially arranged and displayed in order of older shooting times. Namely, succeeding the image of the frame number 61 (the image whose shooting time is the oldest in the ON/OFF duration 1 of the camera power supply), an image of a frame number 71, whose shooting time is the oldest in the camera power supply ON/OFF duration 2, as the same rule an image of a frame number 81 in the camera power supply ON/OFF duration 3, and an image of a frame number 85 in the camera power supply ON/OFF duration 4 are displayed as an index image. Frame advance is made by pressing the cross button at this time, so that an image of a frame number 89 in the remaining ON/OFF duration 5 of the camera power supply is displayed as the index image. At this time, however, the image of the frame number 89 is only displayed as an upper left image of the index image, and no other images are displayed.

FIG. 5D shows a display example when a user issues the instruction to switch a display format on the display screen shown in FIG. 5C. As shown in FIG. 5D, switching is made from the index display of 2×2 to the single frame display. An image displayed in the single frame display at this time is the image of the frame number 61 on which the cursor is positioned in the index image before the switching instruction is issued.

FIG. 5E is as explained in FIG. 4D.

FIG. 5F shows a display example when a user presses the OK button on the display screen shown in FIG. 5C. As shown in FIG. 5F, the image of the frame number 61, on which the cursor is positioned when the OK button is pressed, is displayed as an upper left image of a new index image, and images of frame numbers succeeding the frame number 61 are sequentially displayed as the other images. Such a display is suitable in the case where a user searches for an image close to a predetermined image within the index image shown in FIG. 5C, namely, an image that is shot close to the shooting date and time of the predetermined image (an image close to the frame number 61 in the example shown in FIG. 5F). For instance, if a user desires to search for an image close to a frame number 81 in the display example shown in FIG. 5C, the user moves the cursor to the image of the frame number 81 with the cross button, and presses the OK button on the image of the frame number 81 to display this image as an upper left image of a new index image, and at the same time, the user sequentially displays images of frame numbers succeeding the frame number 81 as the other images, so that the user can search for the image close to the frame number 81.

The display example shown in FIG. 5F is also a display example when an instruction to switch a display format is issued in the display example shown in FIG. 5D, as explained in FIG. 4E.

By instructing/confirming "today's start" in the index display as described above, an index image composed of images whose shooting times are the oldest in respective camera power supply ON/OFF durations are displayed on the LCD 6 as a plurality of images including the image whose shooting time is the oldest among images that are shot today. Accordingly, a user instructs/confirms this rule, for example, in the case where an image desired to be displayed is based on a camera power supply ON/OFF duration among images that are shot today, whereby the user can easily search for the desired image in a short time. Generally, a camera power supply is powered on/off each time a shooting place, a shooting target, etc. is changed in many cases. Therefore, the shooting places and the shooting targets of images which are shot during one camera power supply ON/OFF duration are common in many cases. Accordingly, it is suitable to instruct/confirm this rule when an image whose shooting place, shooting target, etc. is particular among images that are shot today is easily searched in a short time.

Other display examples of the LCD 6 when the above described start image display process shown in FIG. 2 is performed by the electronic camera of the type A, into which the memory card 5_1 recording the images shown in FIG. 3A, is loaded, and the electronic camera of the type B, into which the memory card 5_2 recording the images shown in FIG. 3B is loaded, are explained next.

FIGS. 6A to 6C show these display examples.

FIG. 6A shows a display example when "start at this time" is instructed/confirmed from the start image display menu in an index display of 2×2. In this case, a plurality of images, which include an image whose shooting time (shooting date and time) is the oldest among images that are shot at the time of the most recent camera power supply ON or later, namely, the image of the frame number 89, are displayed as an index image in both of the electronic cameras of the types A and B. Then, the camera power supply is assumed not to be powered off from the most recent camera power supply ON till the current time point in both of the electronic cameras of the types A and B. In the example shown in FIG. 6A, the image of the frame number 89 is displayed as an upper left image of the index image, and images of frame numbers succeeding the frame number 89 are sequentially displayed as the other images. Additionally, shooting times as well as shooting dates are displayed in this example. Furthermore, the cross button is pressed to make frame advance at this time, whereby images before a frame number 88 and images after a frame number 93 are displayed.

In this way, a user instructs/confirms this rule in the case where an image desired to be displayed is an image that is initially shot at the time of the most recent camera power supply ON or later, or an image close to the shooting date and time of the initially shot image, whereby the user can easily search for the desired image in a short time. If shooting is not made at the time of the most recent camera power supply ON or later, no images are displayed on the LCD 6 even if "start at this time" is instructed/confirmed.

FIG. 6B shows a display example when "card start" is instructed/confirmed from the start image display menu in the index display of 2×2. In this case, a plurality of images, which include an image whose shooting date and time is the oldest among the images recorded on the memory card 5, namely, the image of the frame number 1, are displayed as an index image in both of the electronic cameras of the types A and B. In this example, the image of the frame number 1 is displayed as an upper left image of the index image, and images of frame numbers succeeding the frame number 1 are sequentially displayed as the other images. Additionally, the cross button is pressed to make frame advance (index image advance), so that images of frame numbers 5 and after are displayed.

In this way, a user instructs/confirms this rule in the case where an image desired to be displayed is an image whose shooting date and time is the oldest, or an image whose shooting date and time is close to the oldest shooting date and time among the images that are recorded on the memory card 5, whereby the user can easily search for the desired image in a short time.

FIG. 6C shows another display example when "card start" is instructed/confirmed from the start image display menu in the index display of 2×2. In this case, a plurality of images, which include the image whose shooting date and time is the oldest, namely, the image of the frame number 1 among the images that are recorded on the memory card 5, are displayed as an index image in both of the electronic cameras of the types A and B. In this example, the image of the frame number 1 is displayed as an upper left image of the index image, and images whose shooting times (shooting dates and times) are the oldest on respective days are sequentially displayed in order of older shooting dates as the other images. Namely, as shown on the left side of FIG. 6C, succeeding the image of the frame number 1 (the image whose shooting time is the oldest among the images that are shot on September 1), an image of a frame number 29 whose shooting time is the oldest among images that are shot on October 5, an image of a frame number 36 whose shooting time is the oldest on October 10, and an image of a frame number 51 whose shooting time is the oldest on October 20 are displayed as the first page index image. Additionally, as shown on the right side of FIG. 6C, the image of the frame number 61 on October 25 is displayed as the second page index image. As stated earlier, switching from the first page index image to the second page index image is made by pressing the cross button to make frame advance (index image advance).

In this way, a user instructs/confirms this rule in the case where an image desired to be displayed is based on a shooting date, whereby the user can easily search for the desired image in a short time. Generally, respective types of events such as an athletic meeting, a trip, etc., for which ceremonial photographing, etc. is made, are held in units of days in many cases. Accordingly, it is suitable to instruct/confirm this rule when an image of ceremonial photographing, etc. is easily searched in a short time.

In the display example shown in FIG. 6C, the images whose shooting times are the oldest on the respective days are arranged in the order of older shooting dates. The above described display shown in FIG. 6C may be made, for example, if a rule "start of shooting date and time" is added to the start image display menu, and if this rule is instructed/confirmed by a user.

Additionally, in the display example shown in FIG. 6C, for example, the image of the frame number 1, whose shooting date and time is the oldest among the images that are recorded on the memory card 5_1, may be displayed as an upper left image of the first page index image, and images whose shooting times are the oldest in respective camera power supply ON/OFF durations may be displayed in order of older shooting dates and times as the other images, in the case of the electronic camera of the type A,.

A display example of the electronic camera of the type B when "today's start" is instructed/confirmed from the start image display menu in the index display of 2×2 is not shown. In this case, the image of the frame number 61, whose shooting time (shooting date and time) is the oldest among the images that are shot today, namely, the images that are shot on the day when a user instructs/confirms "today's start" as a rule, is displayed as an upper left image of an index image, and images of frame numbers succeeding the frame number 61 are sequentially displayed as the other images.

In this preferred embodiment, "start at this time", "today's start", "card start", and "start of shooting date and time" are referred to as the rules for an image display, which can be instructed/confirmed by a user. However, the rules for an image display are not limited to these rules. Any rule may be available if it is a suitable rule by which a user easily searches for an image desired to be displayed in a short time, and a corresponding image can be extracted (read) from a recording medium.

For example, a rule based on a shooting condition such as a shutter speed, exposure, etc. at the time of shooting can be cited as a rule for an image display suitable for a user such as a professional photographer, etc. A professional photographer sometimes verifies an image shot under a predetermined shooting condition after making many shootings under each shooting condition. If an image is extracted and displayed by a rule based on a shooting condition in such a case, verification can be made in a short time.

The rule based on a shooting condition is explained with reference to FIGS. 7A and 7B.

FIG. 7A shows the relationship between camera power supply ON/OFF durations, shooting conditions, and frame numbers of images that are shot and recorded by the above described electronic camera of the type A. In the meantime, FIG. 7B shows the relationship between shooting conditions and frame numbers of images that are shot and recorded by the above described electronic camera of the type B.

In FIGS. 7A and 7B, "shooting condition" indicates a shooting condition for a shutter speed, exposure, etc. (including exposure correction, strobe light emission condition, or the like), which is set in the electronic camera at the time of shooting. "condition 1", "condition 2", "condition 3", "condition 4", "condition 5", and "condition 6" respectively indicate different shooting conditions. The relationships between the shooting conditions and the frame numbers in FIGS. 7A and 7B are identical.

With the electronic camera of the type A, an image can be extracted and displayed based on a camera power supply ON/OFF duration and a shooting condition. With the electronic cameras of the types A and B, an image can be extracted and displayed based on a shooting condition.

By way of example, if an image is extracted and displayed based on a camera power supply ON/OFF duration and a shooting condition in the relationship shown in FIG. 7A, images whose shooting dates and times are the oldest for respective shooting conditions in respective camera power supply ON/OFF durations (or images whose shooting dates and times are the newest, the middle of the newest and the oldest shooting dates and times, or the like may be available) are extracted and displayed as an index image. That is, the 1st frame of the condition 1 in a duration 1, the 14th frame of the condition 2 in the duration 1, the 31st frame of the condition 3 in the duration 1, the 46th frame of the condition 4 in a duration 2, the 61st frame of the condition 5 in the duration 2, the 71st frame of the condition 5 in a duration 3, and the 81st frame of the condition 6 in the duration 3 are displayed as the index image. Or, if an image is extracted based on only a shooting condition in the relationship shown in FIG. 7A or 7B, images whose shooting dates and times are the oldest for respective shooting conditions (or images whose shooting dates and times are the newest, the middle of the newest and the oldest shooting dates and times, or the like may be available) are extracted and displayed as an index image. Namely, the 1st frame of the condition 1, the 14th frame of the condition 2, the 31st frame of the condition 3, the 46th frame of the condition 4, the 61st frame of the condition 5, and the 81st frame of the condition 6 are displayed as the index image.

If an image is extracted and displayed based on a camera power supply ON/OFF duration and a shooting condition as described above, images whose shooting dates and times are the oldest in respective durations are extracted and displayed even under the same condition, when shooting under the same condition is made in different durations like the condition 5, unlike the case where an image is extracted and displayed based on only a shooting condition,.

If the images thus extracted are displayed, for example, as an index image of 2×2, remaining images are displayed as the next page index image. A user instructs/confirms a predetermined image from the index image, so that the image is displayed as an upper left image of the index image, and images of frame numbers succeeding the frame number of the upper left image are sequentially displayed as the other images. In this way, a user can verify an image shot under a predetermined shooting condition in a short time.

Furthermore, a shooting date may be combined with the above described rule based on a shooting condition, and an image may be extracted based on the shooting date, a camera power supply ON/OFF duration, and the shooting condition, or based on the shooting date and the shooting condition.

Available as other rules for an image display are, for instance, a rule by which images whose shooting dates and times are the newest and the oldest, and an image whose shooting date is positioned at predetermined time intervals or approximately predetermined time intervals between the newest and the oldest are displayed as an index image, a rule by which images whose frame numbers are the smallest and the largest, and an image whose frame number is positioned at predetermined frame intervals or at approximately predetermined frame intervals between the smallest and the largest, and the like.

As described above, according to this preferred embodiment, a representative image, which is convenient to a user to easily search for a desired image in a short time, can be extracted and displayed.

A second preferred embodiment according to the present invention is explained next.

FIG. 8 is a perspective external view of an image printing system according to the second preferred embodiment of the present invention.

As shown in this figure, the image printing system 21 according to this preferred embodiment comprises as recording media loading slots into/from which respective types of recording media can be inserted/ejected: a CD-R (CD Recordable) loading slot 22 into which a CD-R is inserted, a CD-ROM loading slot 23 into which a CD-ROM is inserted, a smart medium loading slot 24 into which a smart medium is inserted, a compact flash loading slot 25 into which a compact flash is inserted, an MMC (Multi Media Card) /SD (Secure Digital) memory card loading slot 26 into which an MMC or an SD memory card is inserted. The image printing system 21 further comprises a USB (Universal Serial Bus) connector 27 and an IEEE1394 (Institute of Electrical and Electronic Engineers 1394) connector 28 as connectors for enabling an image file (image, image data), etc. to be received from an external appliance via a USB cable or an IEEE 1394 cable.

The image printing system 21 still further comprises a display unit 29 displaying an operation guide, etc., an operation unit 30 (30*a*, 30*b*, 30*c*) accepting respective types of instructions from a user, a card insertion slot 31 into which respective types of cards (prepaid card, credit card, etc.) for making payment are inserted, a coin insertion slot 32 into which a coin is inserted, a change ejection slot 33 from which a change is ejected, and an ejection slot 34 from which a label (label seal) or a recording medium, on which an image is printed, is ejected.

Configuration of this image printing system 21 is explained next.

FIG. 9 is a block diagram showing the principal configuration of the image printing system 21.

In this figure, a CD-R drive unit 35 reads an image file, etc. recorded on a CD-R that is inserted and loaded from the CD-R loading slot 22, or writes an image file, etc. to the CD-R.

A CD-ROM drive unit 36 reads an image file, etc. recorded on a CD-ROM that is inserted and loaded from the CD-ROM loading slot 23.

A smart medium drive unit 37 reads an image file, etc. recorded on a smart medium that is inserted and loaded from the smart medium loading slot 24, or writes an image file, etc. to the smart medium.

A compact flash drive unit 38 reads an image file, etc. recorded on a compact flash that is inserted and loaded from the compact flash loading slot 25, or writes an image file, etc. to the compact flash.

An MMC/SD memory card drive unit 39 reads an image file, etc. recorded on an MMC or an SD memory card, which is inserted and loaded from the MMC/SD memory card loading slot 26, or writes an image file, etc. to the MMC or the SD memory card.

The USB connector 27 is a connector for exchanging an image file, etc. with an external appliance via a connected USB cable.

The IEEE1394 connector 28 is a connector for exchanging an image file, etc. with an external appliance via a connected IEEE1394 cable.

The operation unit 30 accepts respective types of instructions from a user, and notifies a control unit 41 of an accepted instruction.

The display unit 29 displays an image recorded on a recording medium, a selection item that a user is made to select, respective types of menus, an operation guide, etc. under the control of the control unit 41.

A printing unit 40 prints an image on a label or a recording medium under the control of the control unit 41. The image printing system 21 comprises at least labels corresponding to respective recording media that are inserted into the recording media loading slots although this is not shown, and the printing unit 40 prints an image on a predetermined label that is selected by the control unit 41 from among the labels. Examples of the labels include a label corresponding to a donut-shaped (circular) thin film corresponding to a circular recording medium such as a CD-R, etc., a label corresponding to an FD (Flexible Disk), an MO (Magneto-Optic), etc., an index sheet accommodated within a CD case for storage along with a recording medium such as a CD-R, etc.

The control unit 41 comprises a CPU, and controls the operations of the entire image printing system 21 according to a control program stored within the unit. The control unit 41 performs, for example, a process for selecting a particular image based on a shooting date condition, etc. from among images recorded on a predetermined recording medium, a process for selecting a label for a predetermined recording medium, a process for printing a particular image on a label or a recording medium, a process for ejecting a label or a recording medium, on which a particular image is printed, to the ejection slot 34, a process for displaying an operation guide, etc. on the display unit 29, and the like. The control unit 41 also performs a payment process according to a card (prepaid card, credit card, etc.) inserted into the card insertion slot 31, or a coin inserted into the coin insertion slot 32, a process for ejecting a change to the change ejection slot 33, and the like.

The image printing system 21 can be implemented also by replacing the control unit 41, for example, with a personal computer (PC).

Operational processes performed by the image printing system 21 having such a configuration are explained next with reference to flowcharts shown in FIGS. 10A and 10B. The processes referred to below are performed in such a way that the CPU comprised by the control unit 41 executes the control program stored within the control unit 41.

Figures 10A, 10B:
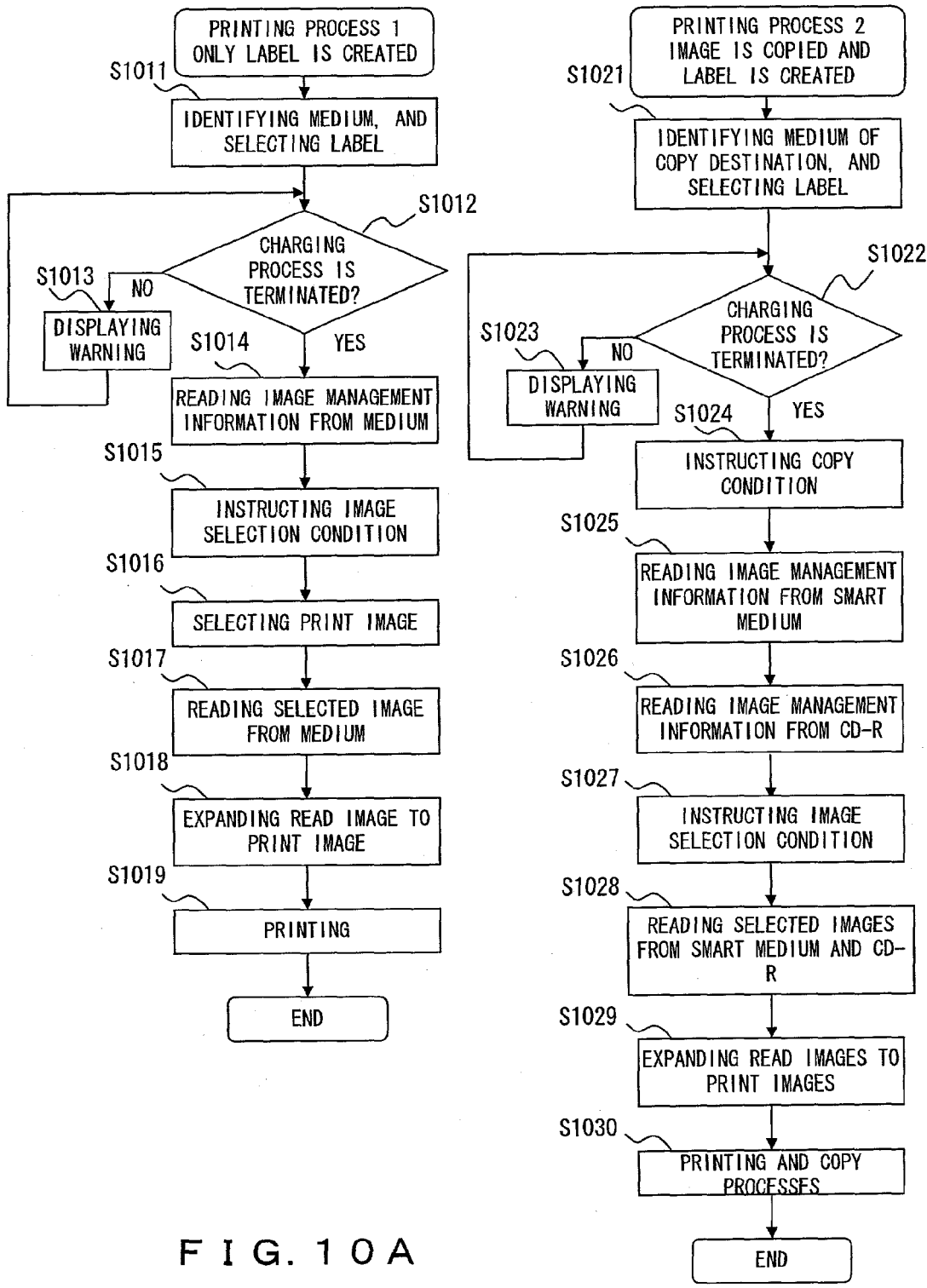
FIG. 10A is a flowchart exemplifying a printing process 1.
FIG. 10B is a flowchart exemplifying a printing process 2.

FIGS. 10A and 10B are the flowcharts exemplifying printing processes performed by the image printing system 21. FIG. 10A shows a printing process 1, whereas FIG. 10B shows a printing process 2.

The printing process 1 is a process performed when a print instruction to select a particular image based on a shooting date condition, etc. from among images that are recorded on a recording medium carried by a user, and to print the particular image on a label is issued. The printing process 1 shown in FIG. 10A is explained by applying a CD-R as one example of the recording medium carried by the user.

In the meantime, the printing process 2 is a process performed when a predetermined image that is recorded on a recording medium carried by a user is copied to another recording medium carried by the user according to an instruction from the user, and a print instruction to select a particular image based on a shooting date condition, etc. from among the predetermined image and images recorded on the recording medium of a copy destination before being copied, and to print the particular image on a label is issued. The printing process 2 shown in FIG. 10B is explained by respectively applying a smart medium and a CD-R to the recording media of the copy source and the copy destination as examples of the recording media carried by the user.

These printing processes 1 and 2 are started in such a way that a user inserts a prepaid card, a credit card, etc. into the card insertion slot 31, or inserts a coin into the coin insertion slot 32 to pay a predetermined charge, also inserts a carried recording medium into any of the recording media loading slots, and issues a print instruction for the printing process 1 or 2 via the operation unit 30 according to the operation guide, etc. displayed on the display unit 29. When a prepaid card, etc. or a coin is inserted, a payment process is performed, and processes such as a process for ejecting the prepaid card inserted into the card insertion slot, a process for ejecting a change to the change ejection slot 13, and the like are performed.

The printing process 1 is first explained with reference to FIG. 10A.

In this figure, upon receipt of the print instruction for the printing process 1 from a user, an inserted recording medium is first identified, and a corresponding label is selected (S1011) Since the inserted recording medium is a CD-R in this example, a CD-R label corresponding to the CD-R is selected. If a recording medium is not inserted in this step, a warning may be displayed until a recording medium is inserted, and subsequent operations may be prohibited from being performed.

Next, it is determined whether or not a charging process is terminated, namely, whether or not the user inserts a valid prepaid card or credit card into the card insertion slot 31, or inserts a coin into the coin insertion slot 32 to terminate the payment of a predetermined charge (S1012). If the result of this determination is "No", a warning stating that the payment of the predetermined charge is not terminated is displayed on the display unit 29 (S1013), and the process returns to S1012. As described above, the warning continues to be displayed until the payment of the predetermined charge is terminated, and at the same time, the subsequent processes are prohibited from being performed.

If the result of the determination made in S1012 is "Yes", image management information is read from an image file recorded on the CD-R (S1014). This image management information is information attached to image data within an image file used, for example, in Exif (Exchangeable image file format). The image management information includes, for instance, the shooting date (file change date and time: DateTime) of the image data, etc. Accordingly, the image management information within the image file recorded on the CD-R is read, so that processes such as a process for assigning orders to images recorded on the CD-R, for example, based on their shooting dates can be performed.

Then, a condition for selecting a particular image from among the images recorded on the CD-R is set according to an instruction from a user (S1015). This process is a process for displaying, by way of example, a plurality of conditions for selecting a particular image on the display unit 29, for making a user select one predetermined condition from among the conditions, and for setting the condition selected by the user as a condition for selecting a particular image. The condition for selecting a particular image is, for example, a shooting date condition, or the like and its details will be described later.

Next, the particular image is selected from among the images recorded on the CD-R based on the set condition for selecting a particular image (S1016). The selected image (image data) is read from the CD-R (S1017), and the read image data is expanded (S1018). An image based on the image data is printed on the label (CD-R label) selected with the above described process of S1011 (S1019). Here, this flow is terminated. Example of the images printed on the label will be described later.

Then, processes such as a process for ejecting the label on which the image is printed to the ejection slot 34 are performed, although they are not shown.

The user affixes the CD-R label thus obtained to the CD-R, and verifies the image printed on the affixed label later, whereby the contents of the image recorded on the CD-R can be easily determined (comprehended).

As described above, the image printing system 21 automatically selects a particular image from among images that are recorded on a recording medium carried by a user based on a condition for selecting a particular image, and prints the selected particular image on a label, thereby eliminating the user load of an image selection.

The printing process 1 shown in FIG. 10A is explained by applying the CD-R as one example of a recording medium. However, it goes without saying that other recording media that can be inserted in the image printing system 21 are processible similarly. As a matter of course, also a recording medium inserted in an external device such as a personal computer that is connected via the USB connector 27 or the IEEE1394 connector 28 is also processible in a similar manner. In this case, the system may be configured so that a label on which a particular image is printed is selected, for example, according to an instruction from a user.

Additionally, in the printing process 1 shown in FIG. 10A, the number of particular images that are selected with the process of S1016 may be a number according to the recording medium identified with the above described process of S1011 in consideration of the printing space of the recording medium to be printed, or the label according to the shape of a recording medium. For instance, if an inserted recording medium is identified as a CD-R, 4 particular images maybe selected. Or, if the inserted recording medium is identified as a smart medium, one image may be selected. Otherwise, a user may be made to choose the number of particular images to be selected according to an identified recording medium. By way of example, if an inserted recording medium is identified as a CD-R, a user may be made to choose any of 1 to 6 as the number of particular images to be selected.

Furthermore, the printing process 1 of FIG. 10A shows the example where the particular image is printed on the label. However, the particular image may be directly printed on a CD-R, namely, the recording medium, which is the recording source of the particular image. Needless to say, other recording media that can be inserted in the image printing system 21 are similarly processible also in this case.

Still further, for the printing process 1 shown in FIG. 10A, the image printing system 21 may be made to comprise a mechanism for automatically affixing a label to a recording medium, and the system may be configured to automatically affix a label on which a particular image is printed to a recording medium, which is the recording source of the particular image, by using the mechanism, and to eject the recording medium to which the label is affixed to the ejection slot 34.

The printing process 2 is explained next with reference to FIG. 10B.

In this figure, upon receipt of a print instruction for the printing process 2 from a user, an inserted recording medium, which will be a copy destination, is first identified, and a corresponding label is selected (S1021). Since the recording medium, which will be the copy destination, is a CD-R in this example, a CD-R label corresponding to the CD-R is selected. If a recording medium of a copy destination is not inserted in this step, a warning may be displayed until the recording medium is inserted, and subsequent processes may be prohibited from being performed.

Next, it is determined whether or not a charging process is terminated, namely, whether or not the user inserts a valid prepaid card or credit card into the card insertion slot 31, or inserts a coin into the coin insertion slot 32 to terminate the payment of a predetermined charge (S1022). If the result of this determination is "No", a warning stating that the payment of the predetermined charge is not terminated is displayed on the display unit 29 (S1023), and the process returns to S1022. In this way, the warning continues to be displayed until the payment of the predetermined charge is terminated, and at the same time, subsequent processes are prohibited from being performed.

If the result of the determination made in S1022 is "Yes", a copy condition instruction is accepted from the user (S1024). In this process, for example, an instruction to copy all of image files recorded on a recording medium (smart medium), which is a copy source and carried by the user, to a recording medium (CD-R), which is a copy destination, or an instruction to copy a predetermined image file selected by the user from among the image files recorded on the recording medium (smart medium), which is the copy source, to the recording medium (CD-R), which is the copy destination, is received as the copy condition instruction accepted from the user.

Then, image management information of the image file, to which the copy instruction is to be issued, is read from among the image files recorded on the smart medium, which is the copy source, based on the copy condition instruction accepted from the user (S1025)

Next, the image management information of the image file recorded on the CD-R, which is the copy destination, is read (S1026).

Then, a condition for selecting a particular image from the image (image file), to which the copy instruction is to be issued, and the images (image files) recorded on the CD-R at this time is set according to an instruction from the user (S1027). This process is a process for displaying a plurality of conditions for selecting a particular image on the display unit 29, for making a user select one predetermined condition from among the displayed conditions, and for setting the condition selected by the user as a condition for selecting a particular image, similar to the process of S1015 shown in FIG. 10A. The condition for selecting a particular image is, for example, a shooting date condition, or the like, and its details will be described later.

Next, particular images are selected based on the set condition, the selected images (image data) are read from the smart medium and the CD-R (S1028), and the read image data are expanded (S1029). Images based on the image data are printed on the label (CD-R label) selected with the above described process of S1021, and the image file, to which the copy instruction is issued, in the above described process of S1024 is copied to the CD-R (S1030). Here, this flow is terminated. Examples of the images printed on the label will be described later. Additionally, in the process of S1030, copying is made after printing. However, printing may be made after copying. Or, printing and copying may be made simultaneously or almost simultaneously.

Then, processes such as the process for ejecting the label on which the images are printed to the ejection slot 34 are performed, although they are not shown.

The user affixes the CD-R label thus obtained to the CD-R, which is the copy destination, and verifies the images printed on the affixed label later, whereby the contents of an image recorded on the CD-R can be easily determined.

As described above, the image printing system 21 automatically selects particular images from among an image to be copied and images that are recorded on a recording medium of a copy destination based on a condition for selecting a particular image, and prints the selected particular images on a label, thereby eliminating the user load of an image selection.

In the printing process 2 shown in FIG. 10B, the particular images are selected before the copying. However, the particular images may be selected after the copying. In this case, the particular images are selected from among the images that are recorded on the CD-R, which is the copy destination.

Additionally, in the printing process 2 shown in FIG. 10B, the number of particular images that are selected with the process of S1028 may be a number according to the recording medium, which is the copy destination and identified with the above described process of S1021, in consideration of the printing space of a recording medium to be printed, or a label according to the shape of a recording medium. For instance, if an inserted recording medium of the copy destination is identified as a CD-R, 4 particular images may be selected. Or, if the inserted recording medium is identified as a smart medium, one image may be selected. Otherwise, a user may be made to choose the number of particular images to be selected according to an identified recording medium of a copy destination. By way of example, if an inserted recording medium of a copy destination is identified as a CD-R, a user may be made to choose any of 1 to 6 as the number of particular images to be selected.

Furthermore, the printing process 2 shown in FIG. 10B is explained by applying the smart medium and the CD-R to the recoding media of the copy source and the copy destination as examples of recording media. However, as a matter of course, if other recording media which can be inserted in the image printing system 21 are applied as the recording medium of the copy source, and other recording media which can be inserted in the image printing system 21 and data can be written to are applied as the recording medium of the copy destination, they are processible in a similar manner. Needless to say, if a recording medium inserted in an external device such as a personal computer, etc. which is connected via the USB connector 27 or the IEEE1394 connector 28 is applied as the recording medium of the copy source or the copy destination, it is also processible in a similar manner. In this case, however, the system may be configured so that a label on which a particular image is printed is selected, for example, according to an instruction from a user.

Additionally, the printing process 2 shown in FIG. 10B shows the example where a particular image is printed on a label. However, the particular image may be directly printed on a CD-R, namely, a recording medium, which is a copy destination. Needless to say, other recording media, which can be inserted in the image printing system 21 and data can be written to, are similarly processible also in this case.

Furthermore, in the printing process 2 shown in FIG. 10B, the image printing system 21 may be made to comprise a mechanism for automatically affixing a label to a recording medium, and the system may be configured to automatically affix a label on which a particular image is printed to a recording medium, which is a copy destination, by using the mechanism, and to eject the recording medium to which the label is affixed to the ejection slot 34.

Still further, the printing process 2 shown in FIG. 10B is explained by assuming that the user carries the recording medium of the copy destination. However, for example, a recording medium, which is a copy destination, may be accommodated within the image printing system 21 beforehand, and the accommodated recording medium may be applied as the recording medium of the copy destination.

Still further, the printing process 2 shown in FIG. 10B shows the form where the image (image file) is copied from the smart medium to the CD-R. However, as a matter of course, an image is processed in a similar manner also in the form where the image is not copied but moved.

The condition for selecting a particular image, which is set with the process of S1015 shown in FIG. 10A and the process of S1027 shown in FIG. 10B, is explained next.

FIGS. 11A to 11F, and 13 are conceptual schematics exemplifying the condition for selecting a particular image. FIGS. 11A, 11B, 11C, 11D, 11E, 11F, and 13 conceptually show a condition 1, a condition 2, a condition 3, a condition 4, a condition 5, a condition 6, and a condition 7.

The condition 1 is explained first with reference to FIG. 11A.

The condition 1 is a condition under which shooting dates are read from the image management information read with the process of S1014 shown in FIG. 10A or the processes of S S1025 and S1026 shown in FIG. 10B, image data are divided into groups based on the shooting dates for respective months, and images whose shooting dates are the oldest are selected from among the image data divided into the groups for the respective months as particular images (image data). The example shown in FIG. 11A is an example where one piece of image data exists in a January group, which is a group of image data shot in January, three pieces of image data exist in a February group, which is a group of image data shot in February, five pieces of image data exist in a March group, which is a group of image data shot in March, and the image data whose shooting dates are the oldest (1, 2, and 5 frames in FIG. 11A: shaded portions) in the groups of the respective months are selected as particular images. Generally, the shooting dates of images shot by an electronic camera are identical or close for each event (occasion, trip, athletic meeting, etc.) to be shot at the time of shooting in many cases. Accordingly, particular images are selected based on the condition 1, whereby a particular image is selected for each event, and a suitable image can be selected.

Under the condition 1, grouping is made for each month. However, grouping may be made for each predetermined time period (predetermined time) such as each year, each week, each day, etc. Additionally, under the condition 1, an image whose shooting date is the oldest is selected from each group. However, an image whose shooting date is the newest, the middle of the oldest and the newest shooting dates, or close to the middle may be selected.

The condition 2 is explained next with reference to FIG. 11B.

The condition 2 is a condition under which a particular image (image data) is selected based on a frame number. A frame number normally corresponds to a shooting date. The older a shooting date, the smaller the numeric value of a frame number (the newer a shooting date, the larger the numeric value of a frame number) The example shown in FIG. 11B is an example where three pieces of image data whose frame number numeric values are the smallest, the middle, or close to the middle, and the largest are selected as particular images, and image data (shaded portions of FIG. 11B) of the corresponding frame numbers 1, 5 and 10 are selected as particular images. Note that the selected frame numbers are not limited to the smallest, the middle or close to the middle, and the largest. Other predetermined frame numbers may be selected as a matter of course.

The condition 3 is explained next with reference to FIG. 11C.

The condition 3 is a condition under which the smallest and the largest frame numbers, and frame numbers at predetermined frame intervals between the smallest and the largest frame numbers are selected as particular images (image data) based on frame numbers. The example shown in FIG. 11C is an example where image data (shaded portions of FIG. 11C) of the smallest frame number 1, the largest frame number 10, and frame numbers 4 and 7 at 2-frame intervals between the frame numbers 1 and 10 are selected as particular images. For the condition 3, predetermined frame intervals are not limited to strictly predetermined frame intervals, and may be approximately predetermined frame intervals.

The condition 4 is explained next with reference to FIG. 11D.

The condition 4 is a condition under which shooting dates are read from the image management information read with the process of S1014 shown in FIG. 10A or the processes of S S1025 and S1026 shown in FIG. 10B, image data whose shooting date is the oldest, image data whose shooting dates is the newest, and image data whose shooting date is the middle of the image data whose shooting dates are the oldest and the newest or close to the middle are selected as particular images (image data) based on the shooting dates. The example shown in FIG. 11D is an example where image data (shaded portions of FIG. 11D) of frame numbers 1, 10 and 7, which are respectively shot in January, July, and April (the middle of January and July or close to the middle) as the image data whose shooting dates are the oldest, the newest, and the middle or close to the middle are selected as particular images.

The condition 5 is explained next with reference to FIG. 11E.

The condition 5 is a condition under which shooting dates are read from the image management information read with the process of S1014 shown in FIG. 10A or the processes of S S1025 and 1026 shown in FIG. 10B, and image data whose shooting date is the oldest, image data whose shooting date is the newest, and image data whose shooting date is at predetermined time intervals between the oldest and the newest shooting dates are selected as particular images (image data) based on the shooting dates. The example shown in FIG. 11E is an example where image data 1, 10 and 5 and 7 (shaded portions of FIG. 11E), whose shooting dates are the oldest, the newest, and at 2-month intervals between the oldest shooting date (January 1) and the newest shooting date (July 1) are selected as particular images. For the condition 5, predetermined time intervals are not limited to strictly predetermined time intervals, and may be approximately predetermined time intervals.

The condition 6 is explained next with reference to FIG. 11F.

The condition 6 is a condition under which image data whose shooting date is the oldest is extracted from image data belonging to a folder based on shooting dates obtained from the image management information read with the process of S1014 shown in FIG. 10A or the processes of S S1025 and 1026 shown in FIG. 10B for each folder (or directory) to which image data belongs, extracted image data are assigned orders based on their shooting dates, and image data whose orders are the first, the middle, and the last are selected as particular images (image data). A folder (or directory) is an assembly of a group of files having some relationship under a tree structure on an OS (Operating System). The example shown in FIG. 11F is an example where image data whose shooting date is the oldest is extracted from among image data belonging to a folder for each of folders indicated by A to J (A, B, C, D, E, F, G, H, I, and J), extracted image data are assigned orders (A-1, . . . , E-1, . . . , J-1), and image data whose orders are the first, the middle, and the last (frames A-1, E-1, and J-1: shaded portions of FIG. 11F) are selected as particular images. Generally, a user creates a folder (or directory) for each event (occasion, trip, athletic meeting, etc.) to be shot at the time of shooting in many cases. Accordingly, images are extracted for respective folders (or directories), and a particular image is selected from among the extracted images, whereby a more suitable image selection can be made. Under the condition 6, image data whose shooting date is the oldest is extracted for each folder. However, the condition for extracting predetermined image data for each folder may be a condition under which one image among particular images, which are extracted based on any of the above described conditions 1 to 5, is extracted. Or, as the condition for selecting particular image data from among image data extracted for respective folders, any one of the conditions 1 to 5 may be applied.

Additionally, for the condition 6, if the number of folders to which image data belong is equal to or smaller than a predetermined number, image data selected one by one from all of folders may be selected as particular images (image data). The process for selecting a particular image in this case is explained with reference to FIG. 12.

Figure 12:
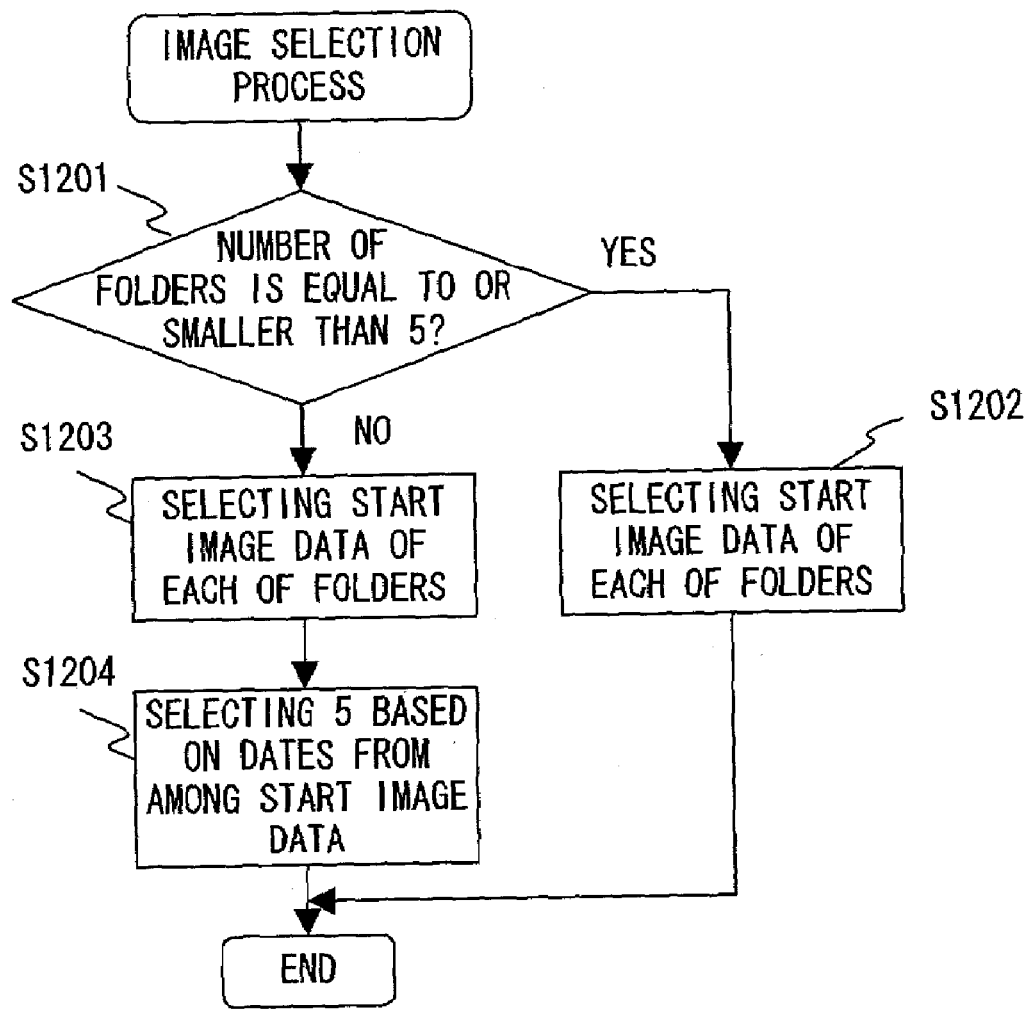
FIG. 12 is a flowchart showing the process for selecting a particular image, which relates to a modification example of the condition 6.

FIG. 12 is a flowchart showing the process for selecting a particular image, which relates to a modification example of the condition 6. The flow shown in this figure assumes the above described predetermined number to be 5 as an example.

As shown in this figure, if the number of folders to which image data belong is equal to or smaller than 5 ("Y" in S1201), image data whose shooting date is the oldest (the first image data) is selected from among the image data belonging to a folder as a particular image for each of the folders (S1202).

Or, if the number of folders to which image data belong is not equal to or smaller than 5 ("N" in S1201), image data whose shooting date is the oldest (the first image data) is extracted from among the image data belonging to a folder for each of the folders as shown in FIG. 11F (S1203), and, for instance, 5 predetermined pieces of image data are selected from among the extracted image data as particular images (image data) based on the shooting dates (S1204).

With such a process, image data selected one by one from all of folders are selected as particular images (image data) if the number of folders is equal to or smaller than 5. Generally, a user manages associated images, for example, images, etc. of each event (occasion, trip, athletic meeting, etc.) for each folder in many cases. Accordingly, particular images are selected for respective folders, so that particular images are selected for respective events, and a suitable image selection can be made. If the number of folders is equal to or larger than 6, particular images are selected based on shooting dates from among images selected one by one from all of folders. Therefore, particular images are not one-sided, for example, on a predetermined event image, whereby a suitable image selection can be made.

The condition 7 is explained next with reference to FIG. 13.

The condition 7 is a condition under which a particular image (image data) is selected based on a shooting date from among image data belonging to a recording medium for each recording medium to which image data previously belongs. Generally, a recording medium used to manage images has a large-capacity, such as a CD-R, etc. in many cases, and image data recorded thereon is copied (or moved) from a recording medium used by an electronic camera, such as a smart medium, a compact flash, etc. in many cases. Furthermore, a user copies (or moves) an image, which is recorded on a smart medium, etc. by shooting, to a recording medium for managing images for each event (occasion, trip, athletic meeting, etc.) to be shot at the time of shooting in many cases. Accordingly, a particular image is selected from among images, which are recorded on the recording medium for managing images for each recording medium to which the image is previously recorded, whereby a particular image is selected for each event, and a suitable image selection can be made. The example shown in FIG. 13 is an example where images whose shooting dates are the oldest are selected as particular images based on shooting date information within image management information, for respective recording media groups, from a group of image data previously recorded on a recording medium 1 (medium 1), a group of image data previously recorded on a recording medium 2 (medium 2), and a group of image data previously recorded on a recording medium 3 (medium 3) in the image data recorded on the recording medium 42 for managing images. Namely, as indicated by underlines shown in FIG. 13, image data "PB23001.jpg", image data "P5150001.jpg", and image data "P8010001.jpg" are selected from the groups of media 1, 2, and 3 as particular images. Note that a means for obtaining on which recording medium image data is previously recorded may be implemented, for example, by using a shooting history file, etc. In this case, information indicating the correspondence between image data and a recording medium of the copy source (or move source) of the image data is recorded to a shooting history file when the image data is copied (or moved), and the shooting history file is referenced later, so that the recording medium of the copy source (or move source) of the image data can be identified. Or, the recording medium of the copy source (or move source) may be identified with a different method. Furthermore, in the example shown in FIG. 13, image data recorded on the same recording medium are divided as one group. However, for example, if image data are copied (or moved) on different days although they are recorded on the same recording medium, the image data may be handled as different groups.

Figure 13:
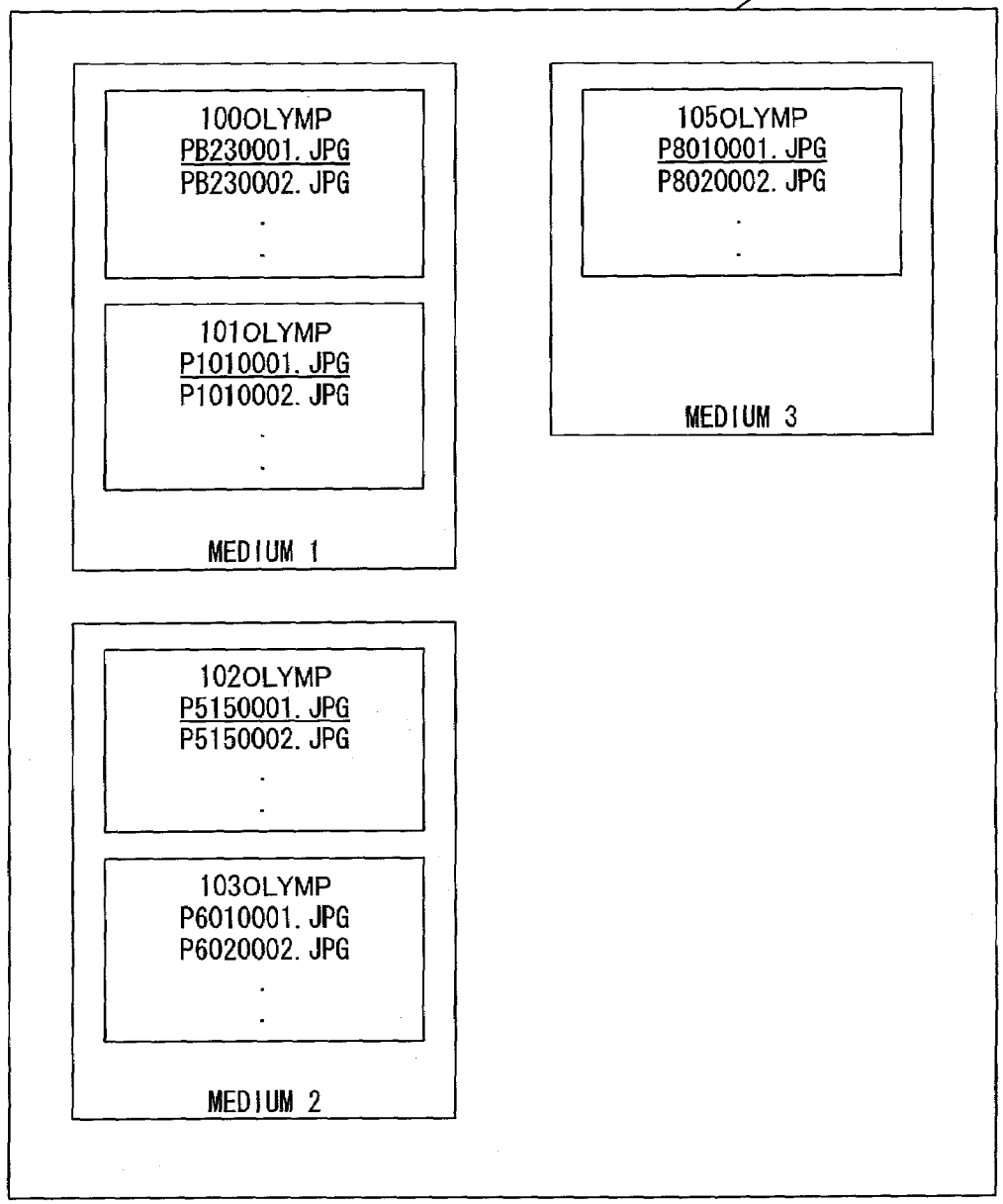
FIG. 13 explains a condition 7 for selecting a particular image.

If such a condition 7 is applied to the flow of FIG. 10B, and if an instruction to copy predetermined image data on the smart medium (medium 3) to the CD-R is issued when the image data previously recorded on the medium 1, and the image data previously recorded on the medium 2 are recorded on the CD-R, image data whose shooting date is the oldest is selected and printed for each of the previously recorded recording media, namely, each of the media 1, 2, and 3 shown in FIG. 13.

Printing examples of particular images obtained with the printing process of S1019 shown in FIG. 10A, or S1030 shown in FIG. 10B are explained next.

FIGS. 14A to 14H show the printing examples of a label for a circular (disc-shaped) recording medium, or the circular recording medium. The circular recording medium is, for example, a CD-R, a CD-ROM, etc.

FIG. 14A is an example where an image whose shooting date is the oldest (image shot on Nov. 23, 2000) is selected and printed from among image data recorded on a recording medium as a particular image. As a result, a user can determine, for example, that an image shot on the shooting date of the printed image or later is recorded on the recording medium. In FIG. 14A, the shooting date "Nov. 23, 2000" of the particular image, medium information, a disk name "family album", and a serial number "1" are printed along with the particular image. As the medium information, "creator: Sato", "creation start date: Nov. 23, 2000", "final creation date: May 15, 2001", "number of images: 958", and "used memory (recorded memory: 532 MB) are printed. The creation start date also indicates the oldest shooting date among the shooting dates of the image data recorded on the recording medium, whereas the final creation date also indicates the newest shooting date among the shooting dates of the recorded image data. The serial number is a number given in the case where a plurality of discs having the same name exist, or the like. Furthermore, the creator, the disc name, and the serial number are printed, for example, according to an input instruction from a user.

FIGS. 14B to 14D show the examples where two images such as an image whose shooting date is the oldest (image shot on Nov. 23, 2000), and an image whose shooting date is the newest (May 15, 2001) among the image data recorded on the recording medium are selected and printed as particular images.

FIG. 14B is an example where these two particular images are printed at the top and the bottom of a print target (a label or a recording medium) shown in FIG. 14B, and the bases of the images are printed to be oriented in the same downward direction. Additionally, shooting dates of the images are printed close to the bases of the respective images, and a disc name and a serial number are printed in a similar manner as in FIG. 14A. In addition, a plurality of arrows are arranged and printed to be sequentially and circumferentially oriented from the image whose shooting date is the oldest to the image whose shooting date is the newest. These arrows enable a user to recognize that images shot in a duration between the shooting dates of the two particular images are recorded on the recorded medium.

FIG. 14C is an example where the disc name, the serial number, the shooting dates and times, and the particular images, which are shown in FIG. 14B, are arranged and printed toward the center of the print target as downward. Accordingly, as shown in FIG. 14C, the respective particular images are printed so that their bases are oriented toward the center of the print target.

FIG. 14D is an example where the image whose shooting date is the newest and its shooting date are printed smaller than the image whose shooting date is the oldest and its shooting date in FIG. 14B. As a result, a user can determine, for example, which image is an image whose shooting date is the newest according to the size of an image.

Figure 14G:
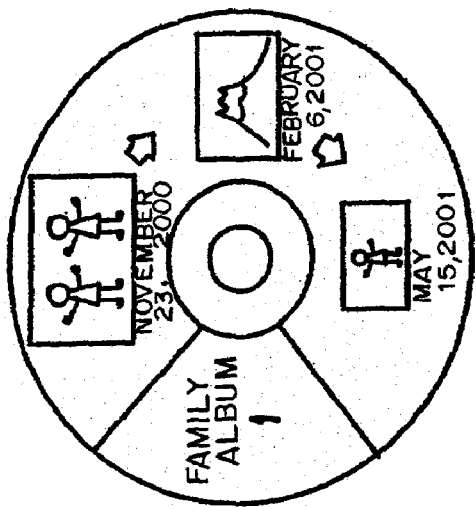
FIG. 14G shows a printing example of a label for a circular recording medium, or on the circular recording medium.
Figure 14F:
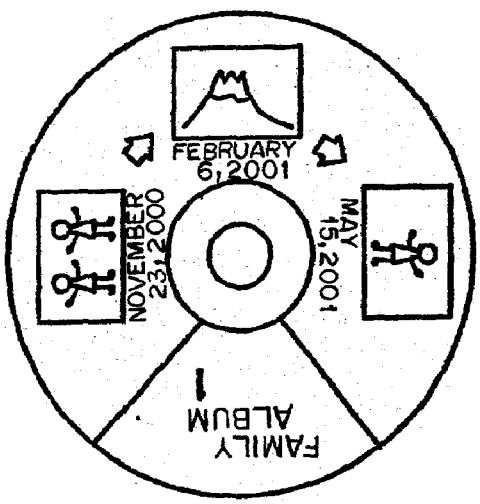
FIG. 14F shows a printing example of a label for a circular recording medium, or on the circular recording medium.
Figure 14E:
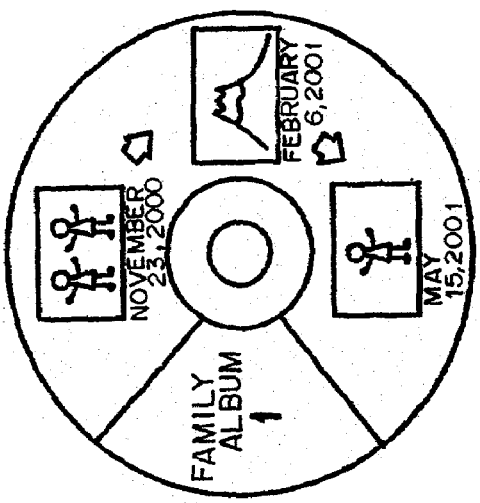
FIG. 14E shows a printing example of a label for a circular recording medium, or on the circular recording medium.

FIGS. 14E to 14G are examples where 3 images such as an image whose shooting date is the oldest (the image shot on Nov. 23, 2000), an image whose shooting date is the newest (the image shot on May 1, 2001), and an image whose shooting date is the middle of the oldest and the newest shooting dates or close to the middle (an image shot on Feb. 6, 2001) are selected from the image data recorded on the recording medium as particular images, and arranged and printed circumferentially.

FIG. 14E is an example where these three particular images are sequentially printed in the top, the right, and the bottom of the print target shown in FIG. 14E in order of older shooting dates, and the bases of the images are printed to be oriented in the same downward direction. Additionally, the shooting dates of the images are printed close to the bases of the images, and the disc name and the serial number are printed in a similar manner as in FIG. 14A. Furthermore, arrows, which are arranged to be headed from the image whose shooting date is the oldest to the image whose shooting date is the newest, are printed between the image whose shooting date is the oldest and the image whose shooting date is the middle or close to the middle, and between the image whose shooting date is the middle or close to the middle and the image whose shooting date is the newest. These arrows enable a user to recognize that images shot in durations between the shooting dates of the images, which interpose the arrows in between, are recorded on the recording medium.

FIG. 14F is an example where the disc name, the serial number, the shooting dates and times, and the particular images, which are shown in FIG. 14E, are arranged and printed toward the center of the print target as downward. Accordingly, as shown in FIG. 14F, the respective particular images are printed so that their bases are oriented toward the center of the print target.

FIG. 14G is an example where printing is made so that the newer the shooting date of a particular image, the smaller the size of the image. As a result, a user can determine, for example, a shooting order (shooting date order) according to the size of an image.

Figure 14H:
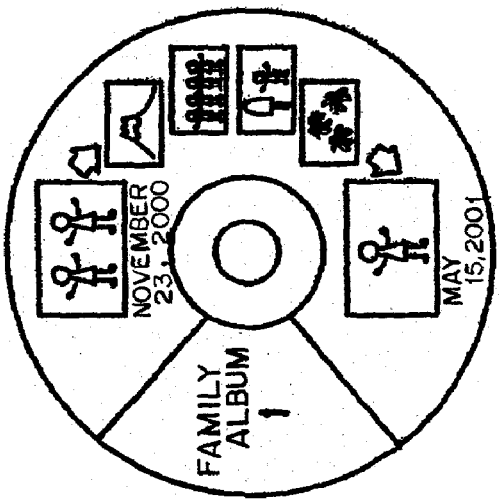
FIG. 14H shows a printing example of a label for a circular recording medium, or on the circular recording medium.

FIG. 14H is an example where 6 pieces of image data are selected from among the image data recorded on the recording medium as particular images (image data), and arranged and printed to be circumferential. In FIG. 14(*h*), printing is made so that the image whose shooting date is the oldest (the image shot on Nov. 23, 2000), and the image whose shooting date is the newest (the image shot on May 15, 2001) are arranged at the top and the bottom of the print target shown in FIG. 14(h), and 4 predetermined images whose shooting dates are between the oldest and the newest shooting dates are arranged to be circumferential from upward to downward in order of older shooting dates at the right of the print target. At the same time, the bases of the 6 images are printed to be oriented in the same downward direction. Additionally, the shooting dates are printed close to the bases of the images whose shooting dates are the oldest and the newest, and the disc name and the serial number are printed in a similar manner as in FIG. 14A. Furthermore, arrows, which are arranged to be headed from the image whose shooting date is the oldest toward the image whose shooting date is the newest, are printed between the image whose shooting date is the oldest and the remaining 4 images, and between the remaining 4 images and the image whose shooting date is the newest. Printing is made in this way, whereby a user can more easily recognize, for example, the images, which are recorded on the recording medium and shot in a duration between the oldest and the newest shooting dates.

Figure 15:
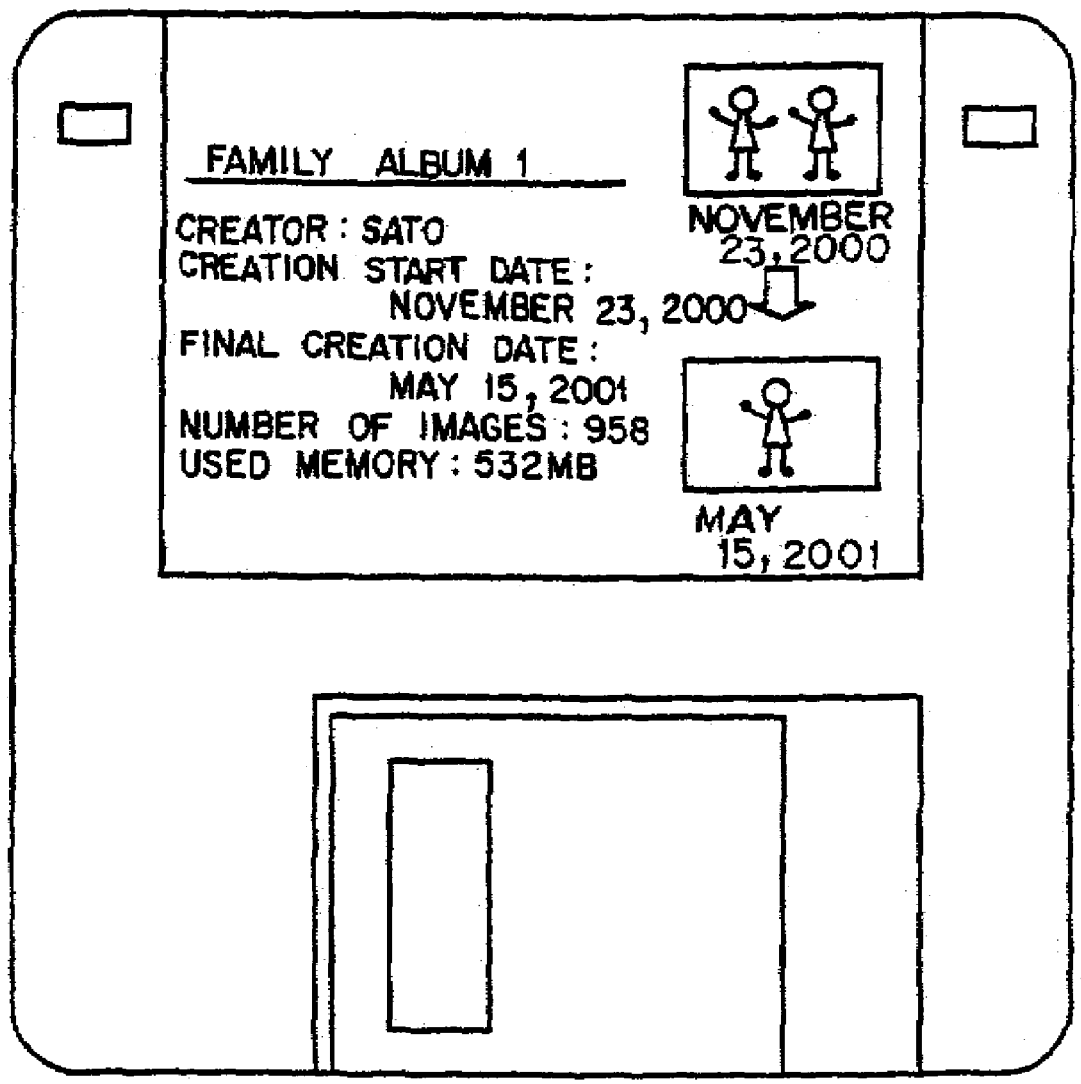
FIG. 15 shows a printing example of a label for a different recording medium, or on the different recording medium.

FIG. 15 shows a printing example of a label for a different recording medium or the different recording medium. The different recording medium shown in this figure is, for example, an FD, an MO, etc.

The example shown in this figure is an example where 2 images such as an image whose shooting date is the oldest (the image shot on Nov. 23, 2000), and an image whose shooting date is the newest (the image shot on May 15, 2001) are selected from among image data recorded on a recording medium as particular images. On the print target (label or recording medium), a disk name, a serial number, medium information, the two particular images, and shooting dates are printed in a similar manner as in FIG. 14A. Additionally, an arrow, which is arranged to be headed from the image whose shooting date is the oldest toward the image whose shooting date is the newest, is printed between the two particular images. As a result, a user can determine, for example, the contents of an image recorded on a recording medium such as an FD, an MO, etc.

The above described examples shown in FIGS. 14A to 14H, and 15 show the printing examples where the selected particular images are printed on the recording medium label or the recording medium. However, the particular images may be printed on an index sheet.

FIG. 16 shows a printing example of an index sheet.

In this figure, the index sheet 43 is accommodated within a storage CD case 44 along with a CD-R, a CD-ROM, etc. This index sheet 43 is created, for example, by printing a particular image on paper, folding the paper in its middle after being printed, and stacking the folded paper. On a cover page of the index sheet, printing similar to the printing example shown in FIG. 15 is made. Additionally, particular images other than images whose shooting dates are the oldest and the newest are printed, for example, in order of older shooting dates on an internal page of the index sheet, although this is not shown. As a result, a user can easily recognize the contents of an image recorded on the recording medium accommodated within the CD case 44.

This preferred embodiment refers to an embodiment where particular images are selected based on a shooting date condition, etc. However, particular images may be selected based on a different condition if the condition enables a suitable image selection.

As described above, according to this preferred embodiment, an image, which is convenient to a user to determine the contents of an image recorded on a recording medium, can be easily extracted in a short time, and printed on a print target. Furthermore, such an image is automatically printed, thereby eliminating the user load of an image selection.

As described above in detail, according to the present invention, a particular image to be targeted can be easily extracted from among a plurality of images in a short time.

As described above, the present invention is described in detail. However, the present invention is not limited to the above described preferred embodiments. Any improvements and changes can be made within a scope where the gist of the present invention is not deviated, as a matter of course.

What is claimed is:

1. An electronic camera, comprising:
a display unit having a display mode for displaying a single image fully on the display unit and a display mode for displaying a plurality of images at the same time in parallel fully on the display unit, and is capable of displaying in the display modes switching from one to another;
an extracting unit extracting an image from among a plurality of images which are recorded on a recording medium, and attached with shooting time and date information and obtained by shooting, based on any of a plurality of rules that include an image whose shooting date and time is oldest among images in the recording medium, an image whose shooting time is oldest among images in the recording medium shot on a same date, and an image whose shooting time is oldest among images in the recording medium shot on a current date;
a representative image display unit making said display unit display the image extracted by said extracting unit; and
a switching unit for directing a switching of display; wherein
in a condition that a single image is displayed fully on said display unit, according to a direction from said switching unit, said representative image display unit makes a screen display an image representing selection rules for selecting an image to be displayed as a representative image between an image whose shooting date and time is oldest among images in the recording medium and an image whose shooting time is oldest among images in the recording medium shot on a current date, and in a case that said switching unit directs to display an image whose shooting date and time is oldest among images in the recording medium, said extracting unit extracts the image whose shooting date and time is oldest among images in the recording medium and the representative image display unit makes said display unit display the extracted image, and in a case that said switching unit directs to display an image whose shooting time is the oldest among images in the recording medium shot on a current date, said extracting unit extracts the image whose shooting time is the oldest among images in the recording medium shot on a current date and said representative image display unit makes said display unit display the extracted image; and
in a condition that said displaying unit displays a plurality of images in parallel, according to a direction from said switching unit, said representative image display unit makes a screen display an image representing selection rules for selecting an image to be displayed as a representative image from among an image whose shooting date and time is oldest among images in the recording medium, an image whose shooting time is oldest among images in the recording medium shot on a same date, and an image whose shooting time is oldest among images in the recording medium shot on a current date, in a case that said switching unit directs to display an image whose shooting date and time is oldest among images in the recording medium, said extracting unit extracts an image whose shooting date and time is oldest among images in the recording medium along with a plurality of successive images of which a top image is the extracted oldest image and said representative image displaying unit makes said display unit display the extracted images at the same time in parallel, and in a case that said switching unit directs to display an image whose shooting time is oldest among images in the recording medium shot on a same date, said extracting unit extracts an image whose shooting time is oldest among images in the recording medium shot on a same date for a plurality of dates and said representative image display unit makes said display unit display the plurality of extracted images in ascending order based on date and time at the same time in parallel, and in a case that said switching unit directs to display an image whose shooting time is oldest among images in the recording medium shot on a current date, said extracting unit extracts an image whose shooting time is oldest among images in the recording medium shot on a current date along with a plurality of successive images of which a top image is the extracted oldest image, and said representative image display unit makes said display unit the extracted images at the same time in parallel.

* * * * *